United States Patent [19]
Voss et al.

[11] Patent Number: 5,818,982
[45] Date of Patent: Oct. 6, 1998

[54] FIBER OPTIC SENSOR BASED UPON BUCKLING OF A FREELY SUSPENDED LENGTH OF FIBER

[76] Inventors: Karl Friedrich Voss, 125 N. Evelyn Dr., Anaheim, Calif. 92805; Keith Herbert Wanser, 26202 Escala Dr., Mission Viejo, Calif. 92691

[21] Appl. No.: 625,202

[22] Filed: Apr. 1, 1996

[51] Int. Cl.⁶ .............................. G02B 6/00; G01B 11/14
[52] U.S. Cl. ................................................................ 385/13
[58] Field of Search .................................. 385/12, 13, 32

[56] References Cited

U.S. PATENT DOCUMENTS

| | | | |
|---|---|---|---|
| 4,071,753 | 1/1978 | Fulwenwider et al. | 250/227 |
| 4,163,397 | 8/1979 | Harmer | 73/800 |
| 4,421,979 | 12/1983 | Asawa et al. | 350/96.15 |
| 4,822,135 | 4/1989 | Seaver | 385/13 |
| 5,042,905 | 8/1991 | Anjan et al. | 385/13 |
| 5,134,281 | 7/1992 | Bryenton et al. | 250/227.14 |
| 5,274,226 | 12/1993 | Kidwell et al. | 250/227.16 |
| 5,321,257 | 6/1994 | Danisch | 385/13 |
| 5,396,568 | 3/1995 | Reed et al. | 385/13 |
| 5,396,569 | 3/1995 | Yanagawa et al. | 385/12 |

OTHER PUBLICATIONS

"A Treatise on the Mathematical Theory of Elasticity" by A.E.H. Love, Dover, New York (1944), pp. 381–398 Chapter XVIII and pp. 399–426 Chapter XIX. (No Month).

"Historical Review of Microbend Fiber–Optic Sensors" by John W. Berthold III, Journal of Lightwave Technology vol. 13, No. 7 (Jul. 1995) pp. 1193–1199 and (Erratum vol. 13, No. 9 (Sep. 1995) pp. 1935.

"Fiber Optic Sensors: An Introduction For Scientists And Engineers", E. Udd, ed., (Wiley, New York 1991) pp. 142 (several references to microbend sensors on pp. 154 and pp. 333, 337, 339, 421–422, 427–428. (No Month).

"Strength of Materials" by J.P. Den Hartog, Dover, New York (1961), pp. 79–81 and pp. 184–191.

"The Feynman Lectures On Physics" by R.P. Feynman, R.B. Leighton and M. Sands, vol. II, Addison Wesley (1964), pp. 38–39 through 38–12. (No Month).

"Theory of Elasticity" by L.D. Landau and E.M. Lifshitz, Pergamon, New York (1970), pp. 75–100. (No Month).

*Primary Examiner*—John D. Lee
*Assistant Examiner*—Ellen E. Kang
*Attorney, Agent, or Firm*—Leonard Tachner

[57] ABSTRACT

A new class of fiber optic sensors based on nonlinear buckling of fibers and optical bend loss provide intrinsic, all-fiber displacement sensors which exhibit several unique properties. Primary among them is a sensing range from less than 1 μm to several mm, which is convenient for many structural monitoring applications. This sensing range is also very convenient for many actuator and lever arm sensing applications. In addition, the sensors exhibit a very low temperature dependence of the response, and are easily configurable for a variety of novel applications. They may be implemented with single-mode, few mode, or highly multimode fibers, including plastic optical fiber (POF). Both step index and graded index profile fibers produce useful sensors with differing response characteristics.

31 Claims, 22 Drawing Sheets

FIBER OPTIC SENSOR BASED UPON BUCKLING OF A FREELY SUSPENDED LENGTH OF FIBER

BACKGROUND OF THE INVENTION

1. Field of the Invention

The present invention relates generally to the field of fiber optic sensors and more specifically to fiber optic sensors wherein the shape of a length of fiber is changed under carefully controlled boundary conditions, providing a reproducible macro-bending-induced loss which can be implemented in a variety of highly precise and wide range of sensor applications.

2. Prior Art

Numerous types of fiber optic sensors have been developed. Of the intensity-based sensor types (Udd 1991), the microbend sensors have been the most popular and carefully tested. A recent review of microbend sensors (Berthold 1995) points out that theoretical models have had difficulty predicting light loss versus deformer displacements, as well as the saturation effects that occur at large displacements when the core light has been substantially depleted. Although several papers have reported on field use of a variety of fiber optic microbend sensors, most have not found wide use in practice (other than for alarm mode or tactile sensing) due to problems associated with erratic response, tolerances of the deformers, mechanical fatiguing of the fiber, and a limited quantitative understanding of the mode problems and radiation loss associated with the use of highly multimode fiber. Berthold also points out the large stiffness of microbend sensors which have spring constants generally in the range of 500–2000 lbs./in. There are reports of industrial use of a high temperature microbend pressure transducer (see Berthold in Udd). Similarly, several patents have been granted on fiber optic sensors employing microbending.

All such patents relate to microbending optical fiber rather than to macrobending or non-linear buckling. The significant advantage of the latter over the former relates to the predictability and reproducibility, which are difficult at best in microbending, but readily achievable in macrobending which employs non-linear buckling. This feature is especially significant in sensors used for making precise measurements over a wide dynamic range.

The following are some examples of prior art microbend devices:

U.S. Pat. No. 4,163,397 to Harmer discloses an optical strain gauge using periodically repeating bends in an optical fiber to determine the strain of a substrate. Unlike the present invention, this prior art disclosure relates to a microbend phenomenon incurred by distorting the fiber along its length in response to movement of a cantilever structure.

U.S. Pat. No. 4,071,753 to Fulenwider et al discloses a device for converting acoustic energy to optical energy, such as for communications. In one disclosed embodiment, a diaphragm bends the mid-section of a continuous loop of optical fiber to cause variations in light transmission through the fiber in response to the mechanical travel of the diaphragm. In contrast to the present invention, this device relies on mechanical distortion of the fiber along its length and the use of hinged boundary conditions.

U.S. Pat. No. 5,134,281 to Bryenton et al relates to a physiological sensor for monitoring heart beats and other muscle movement. The sensor uses a fiber configured as a multiple period sinusoid and relies on microbending of the fiber upon expansion and contraction of a resilient backing which is secured, for example, around the chest of an infant who's heart beat or breathing is to be monitored. Unlike the present invention, there is no disclosure of non-linear buckling or macrobending of a boundary condition-controlled fiber wherein movement in one or more selected directions at the boundary is the sole source of transmission or reflection changes. Although the use of just one loop is disclosed, the impressed movement of the entire fiber, rather than only at the boundaries, would make it difficult, if not impossible, to precisely relate loss to the monitored parameters such as minute amounts of strain or the like.

U.S. Pat. No. 5,274,226 to Kidwell et al relates to an optical position sensor wherein rotation of a shaft causes microbending of the fiber which can be used to measure the rotation of the shaft via transmission loss. Again, displacement of the entire fiber causes microbending losses, rather than motion only of the boundaries which produce nonlinear buckling in a macrobending approach.

Most such sensors employ a plurality of periodic or random bends to provide the desired transduction loss mechanism. It is well-established that small random or periodic undulations in the direction of an optical fiber's axis, known as microbends, can cause a significant reduction in the fiber's optical transmission. Microbending is generally distinguished from macrobending by the criterion that in microbending the transverse displacements of the fiber axis from straightness are generally small compared to the fiber lateral dimensions. Furthermore, macrobending combined with selective boundary conditions with an otherwise unrestricted length of fiber provides a much greater range of motion as compared to a microbending-based optical sensor.

The basic equation governing the bending of thin rods and beams (those whose lateral dimensions are small compared to the radius of curvature) is given in numerous books discussing elasticity see:

1. A TREATISE ON THE MATHEMATICAL THEORY OF ELASTICITY by A. E. H. Love, Dover, N.Y. (1944), pp. 381–398 Chapter XVIII and pp. 399–426 Chapter XIX;
2. FIBER OPTIC SENSORS: AN INTRODUCTION FOR SCIENTISTS AND ENGINEERS, E. Udd, ed., (Wiley, New York, 1991) pp. 142 (several references to microbend sensors on pp. 154 and pp. 333, 337, 339, 421–422 and 427–428);
3. HISTORICAL REVIEW OF MICROBEND FIBER-OPTIC SENSORS" by John W. Berthold III, Journal of Lightwave Technology Vol. 13, No. 7 (July 1995) pp. 1193–1199 and (Erratum Vol. 13, No. 9 (September 1995) pp. 1935;
4. STRENGTH OF MATERIALS by J. P. Den Hartog, Dover, N.Y. (1961), pp. 79–81 and 184–191;
5. THE FEYNMAN LECTURES ON PHYSICS by R. P. Feynman, R. B. Leighton and M. Sands, Vol. II, Addison Wesley (1964), pp. 38-9 through 38-12; and
6. THEORY OF ELASTICITY by L. D. Landau and E. M. Lifshitz, Pergamon, N.Y. (1970), pp. 75–100.

SUMMARY OF THE INVENTION

The present invention provides a highly reproducible shape by application of forces and/or torques (any of which may be zero) to two locations of a freely suspended length of optical fiber, which allows controlled and reproducible transition and (macro) bending losses. The optical fiber is completely unconstrained laterally between the two locations of forces or torque application by any agent (although masses may be attached to it in certain applications). The design also greatly reduces problems associated with the different moduli of the fiber coating and fiber, since the shape of the fiber, and thus its attendant loss, is independent of the moduli and cross-sectional area of the fiber (provided it is prismatic, i.e., uniform along the length). This has the effect of eliminating temperature sensitivity due to changing moduli or thermal expansion changes in the cross-section of the fiber or fiber coating. Residual temperature sensitivity comes from increases in length of the fiber due to temperature, which amounts to changes in free length of no more than $10^{-4}$. Another contribution to temperature sensitivity of bending loss is due to changes in the photoelastic constants and refracture index with temperature, which is also very small for fused silica optical fibers. The inventive shapes have the advantage of minimizing overall elastic strain energy so as to prevent overstrain of the fiber at any given location, and allow for convenient design evaluation of maximum allowable strain, consistent with desired optical waveguide loss and displacement sensing range.

The invention includes a variety of clamped, clamped-free and clamped-hinged configurations using both multimode, few mode, two mode and single mode fibers with both incoherent and coherent light sources. The clamped-free configurations can also be interrogated in a reflective mode of operation (a CCD mode of operation is possible in accelerometer applications). A further advantage of the present invention is that the optical fiber is secured only at either end of its bent section. Considerable size and geometric advantages are realized because of the absence of any restraining structure surrounding the bent section. For example, microbend transducers would be hard to adapt to actuation by a fuel gauge, whereas the invention is easily adapted to many actuator/lever arm situations.

The invention can be implemented in highly multimode, plastic optical fiber, single-mode optical fiber, and two mode or few mode optical fiber, each with respective differences. Single mode and two mode versions exhibit interferometric loss oscillations which can be used to provide absolute sensor calibration when using coherent light sources. The sudden change in curvature of the fiber near the clamping points produces enhanced backscattering, which can be utilized in optical time domain reflectometry, OTDR, modes of sensor interrogation to reduce averaging time required by weak Rayleigh backscattering.

The inventive sensors take advantage of transmission losses due to macroscopic bending of optical fibers. We initially distinguish only two types: the so-called $\Omega$-sensor and $\alpha$-sensor which are distinguished by their respective shapes between the clamping points. The two end-points of the sensor are mobile with respect to each other (initially confined along the axis of the sensor; this restriction will later be lifted). Typical dimensions are approximately 1 cm for the sensor length (between the two end-points), which implies that the maximum height of the sensor is on the order of 0.4 cm. More details on the explicit shape of the sensor are discussed below.

One of the key features of this sensor is the way in which the boundary conditions (the shape of the fiber at the end-points of the sensor) are enforced: both location and slope of the clamping points are controlled. In the case of clamped-clamped boundary conditions, the slope of the fiber is controlled at the clamping points. We indicate three different means of doing so: one can adhere the fiber onto a substrate while it is in a well-defined orientation (i.e., while an $\Omega$-sensor is fully extended), one can feed the fiber through a small tube connected to the substrate, or one can clamp it between two external blocks. Other possibilities also exist and will be mentioned below.

This control ensures that, irrespective of which shape the sensor will take by virtue of moving the two ends with respect to each other, one can reproducibly make the transmissivity of the sensors go from 100% to less than detectable levels. This enormous range allows sensitive measuring of distances. We have demonstrated better than 1 $\mu$ strain resolution of the sensors. At the same time, the sensors are capable of withstanding strains of over 100%.

The exact shape of an $\Omega$-type sensor is related to the shape of a thin pillar buckling under stress while rigidly connected at both ends. Generally speaking, this is a problem of interest to mechanical engineers; note, however, that they are only interested in the very limiting case of how much force the pillar can take before buckling—we are explicitly interested in the buckling shape and displacement, curvature, etc.

Modeling the $\Omega$-type sensor, we find that the losses are mostly due to the three different regions of highest curvature.

One of the most significant advantages of the inventive sensors is their versatility. The sensors can be used in series and can easily be multiplexed. By correctly pre-bending the sensors one can ensure being in a region of maximum sensitivity. The physical size of the sensors can be changed for tuning them to specific sensitivities. The shape of the sensor need not be restricted to two dimensions: corkscrew and other three-dimensional fiber arrangements have applications. The sensors are also exceptionally easy to attach and are essentially two-dimensional in most cases.

Both the $\Omega$-type and $\alpha$-type sensors can be used both in OTDR and straight transmission mode. By immobilizing one of the two end-points, distances can be measured to approximately $2 \times 10^{-9}$ meters in certain cases.

By adding a small mass onto the sensor, one can build optical accelerometers. Making the detection mass magnetic/dielectric/paraelectric/ferroelectric results in a magnetic/electric field detector. Any mass material of a density different for a fluid in question, will make a sensor capable of detecting fluid levels. Sensors can be put into other configurations for multidirectional sensors: any (one, two or three-dimensional) amount of movement will be detected.

OBJECTS OF THE INVENTION

It is therefore a principal object of the present invention to provide a unique fiber optical displacement sensor which utilizes macrobending to achieve new levels of sensitivity, resolution and dynamic range in a variety of sensing applications.

It is another object of the invention to provide a fiber optic displacement sensor based upon optical bend loss due to non-linear buckling of fibers under controlled boundary conditions.

It is still another object of the invention to provide a fiber optic displacement sensor comprising a length of optical fiber secured at spaced points and having no restraints therebetween whereby highly predictable optical loss occurs through the fiber when the distance between the points is changed.

It is still another object of the invention to provide a fiber optic displacement sensor comprising a length of optical fiber secured at spaced points and having no restraints therebetween whereby optical loss variations through the length of fiber correspond to precise distances between the spaced points.

It is still another object of the invention to provide a fiber optic sensor comprising a length of optical fiber secured at spaced points and having no restraints therebetween whereby optical loss variations through the length of fiber correspond to the distance between the spaced points and orientation and relative direction of the length of fiber at the spaced points.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 33, which comprises

FIG. 34, which comprises

FIG. 36, which comprises

FIG. 40, which comprises

FIG. 41, which comprises

DETAILED DESCRIPTION OF PREFERRED EMBODIMENTS

ANALYSIS OF SHAPE FUNCTION FOR PLANAR FIBER SENSORS

Figure 1:
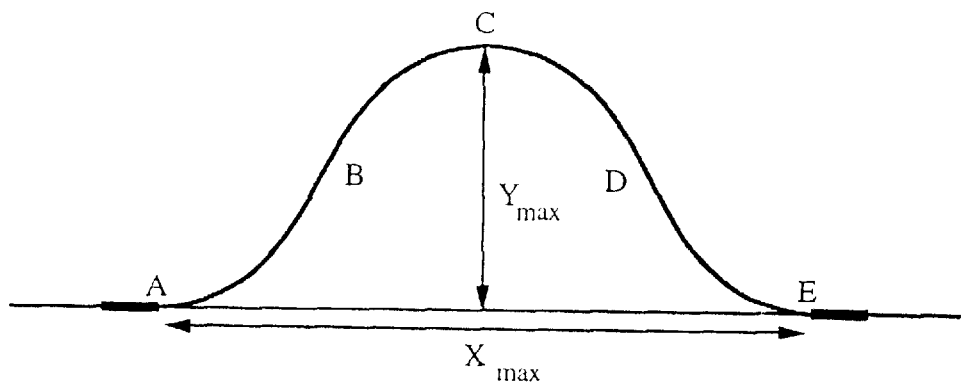
FIG. 1 is a schematic of the sensor in which various relevant points and distances are identified.

For the purposes of our present discussion, the inventive fiber optic sensor consists of a freely suspended length of optical fiber whose shape is solely determined by the application of forces and/or torques applied at two specific locations which we call the attachment or clamping points. The fiber is unconstrained laterally between the two locations of application of forces and/or torques. There are numerous shapes that can be implemented for a variety of fiber sensing configurations, each with unique properties. The first and most basic shape we consider is the uniaxial-type of sensor which is straight in the extended configuration, as shown schematically in FIG. 1. We call this the Ω sensor configuration, since the buckled shape resembles the greek letter omega for large deformations. In this configuration, the boundary conditions on the clamped regions are that the lateral displacement is zero and the slopes are zero at these points (points A and E in FIG. 1) so-called clamped clamped boundary conditions, although this is not necessary in more general cases.

The basic equation governing the bending of thin rods and beams (those whose lateral dimensions are small compared to the radius of curvature) is given in numerous books discussing elasticity (see Feynman, Landau and Lifshitz, Den Hartog, Love) as $$\frac{EI}{R} = M \tag{1}$$

where M is the bending moment at a particular location along the fiber, E is the fiber Young's modulus, R is the local radius of curvature, and I is the moment of inertia of the cross-section. For the case of a cylindrical cross-section of radius a made of a single material $$I = \frac{\pi a^4}{4} \tag{2}$$

(the form of the equation must be slightly modified when both the glass fiber and its coating are to be taken into account by replacing the product E I by $(E_f I_f + E_c I_c)$ (Den Hartog pp. 109–110) where the subscripts c and f refer to fiber and coating respectively, and the moment of inertial of the coating is given by $I_c = \pi(b^4 - a^4)/4$, where b is the coating outer diameter. In typical telecommunications fibers, the coating outer diameter is usually almost a factor of 2 larger than the fiber diameter (240 μm vs. 125 μm), and the soft acrylate modulus is considerably smaller than that of the glass. In the case of polyimide coated fiber, the coating outer diameter is somewhat smaller than for the acrylate fiber, but the modulus of polyimide is considerably larger than that of acrylate coatings. For the case of gold coated fiber, the coating is typically a small fraction of the fiber diameter (~10 μm), and the modulus for gold smaller than that of glass. In each individual case, if one is interested in determining the bending moments involved, one would have to calculate using explicit values for each of these. However, the shape function y(x) of the uniaxial elastica is independent of the modulus and moment of inertia, and only depends on the straight length $L_o$ and the fractional compressional from this value.

Figure 2:
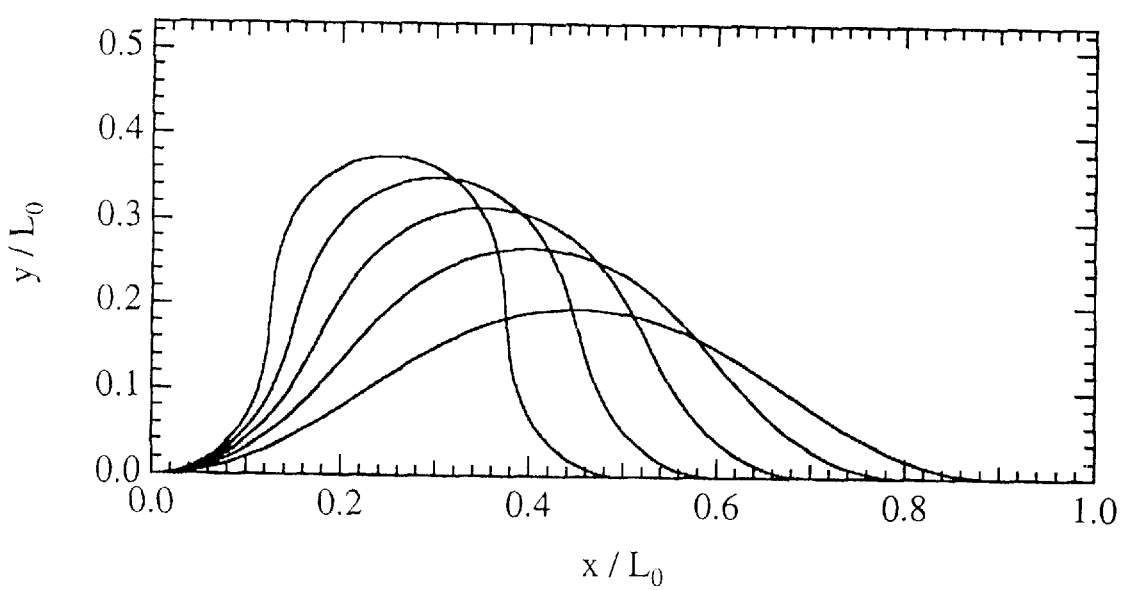
FIG. 2 is a graphical representation of some of the shapes the Ω-type sensor will assume upon displacement of the attachment points with respect to each other.

The form that the bending moment takes depends on the boundary conditions. For the case of a uniaxial planar shape shown in FIG. 2, and boundary conditions appropriate to the clamped-clamped case, the local bending moment is given by $$M = M_0 - Py \tag{3}$$

where $M_o$ is the torque applied at the ends of the freely suspended length P is the longitudinal force required to deform the rod, and y(x) is the function describing the lateral displacement of the fiber from the axis as a function of the distance x measured from one clamping point. The terminology is shown in the following figure. Note that both $M_o$ and P are unknown and must be determined by solving the bending beam equation and applying the clamped-clamped boundary conditions. An example of this procedure will follow.

For the case of planar deformations, the local radius of curvature R is related to the lateral displacement of the fiber y(x) by $$\frac{1}{R} = \frac{d^2y/dx^2}{[1 + (dy/dx)^2]^{3/2}} \tag{4}$$

Thus we find the equation describing the shape of the Ω-type planar sensor subject to the clamped end boundary conditions $$EI \frac{d^2y/dx^2}{[1 + (dy/dx)^2]^{3/2}} = M_0 - Py \tag{5}$$

In most discussions in engineering literature, the deformation of the rod or beam (or in this case, fiber) is small, and an approximation is usually made that neglects the first derivative of the displacement with respect to position, the small slope approximation. This results in a linear, second order differential equation. In contrast, the sensors of the current invention employ nonlinear buckling and operate at displacements far beyond the limits of validity of the small slope approximation so that the full nonlinear equation 5 is required to describe their operation.

The solution to equation 5 which describes the shape of the planar configuration of the fiber is given in the form of the following parametric equations, $$x = L_o[2E(\phi\backslash\mu) - F(\phi\backslash\mu)]/F(2\pi\backslash\mu) \tag{6}$$

$$y = 2L_o \sin \mu (1 - \cos \phi)/F(2\pi\backslash\mu) \tag{7}$$

where y and x are the coordinates of a point on the curve describing the shape of the fiber, $F(\phi\backslash\mu)$ and $E(\phi\backslash\mu)$ are the elliptic integrals of the first and second kinds respectively, $\phi$ is a parametric variable between 0 and $2\pi$ which describes where on the curve the point of interest is, $L_o$ is the straight length of the fiber and $\mu$ is a variable determined by the solution to the following transcendental equation, $$\Delta x = 2L_o[1 - E(2\pi\backslash\mu)/F(2\pi\backslash\mu)] \tag{8}$$

where $\Delta x$ is the amount the fiber attachment points are displaced towards each other. As can be seen from equation 8, μ depends on the amount the fiber attachment points are displaced towards each other relative to the straight fiber length $L_o$. The shapes of the curves are thus universal for a given fractional amount of compression. Some shapes are presented in FIG. 2. Each successive curve corresponds to an increase in compression of 10% relative to the straight fiber length between 90% and 50%. Note that the coordinates are scaled by the straight fiber length $L_o$, emphasizing the universal nature of the fiber shapes, independent of the straight fiber length.

Having discussed the basic fiber shape, numerous other useful fiber shapes are possible, using the same principles discussed above. Some of these are discussed in what follows.

MANUFACTURING

One makes the inventive sensors by controlling the movement of an optical fiber at the two end-points (the attachments), while the section of fiber between these two points is left unrestricted.

The two attachments are then moved with respect to each other. Most important is to ensure a controlled location and slope of the fiber at the attachment points. The lengths $L_o$ to be employed will be discussed in the section on scaling.

1. SIMPLEST CONSTRUCTION TECHNIQUE: CLAMPING THE FIBER

Figure 3:
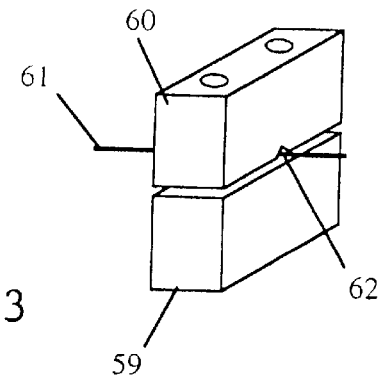
FIG. 3 is a three-dimensional view of a device used to clamp fibers.

The simplest Ω-type sensors are made by clamping an optical fiber (61) (see FIG. 3) at two locations. It is important to realize that this method is not ideal, since it is necessary to hold the fiber sufficiently tight to ensure that it will not slip, while at the same time trying to avoid crushing the fiber. This construction technique often introduces additional loss, rendering the sensor less sensitive than optimal, or introduces mechanical instabilities. One can reduce this problem somewhat by adding small grooves 62 to one or both of the two clamps (59, 60) (see block 60 in FIG. 3).

Figure 4:
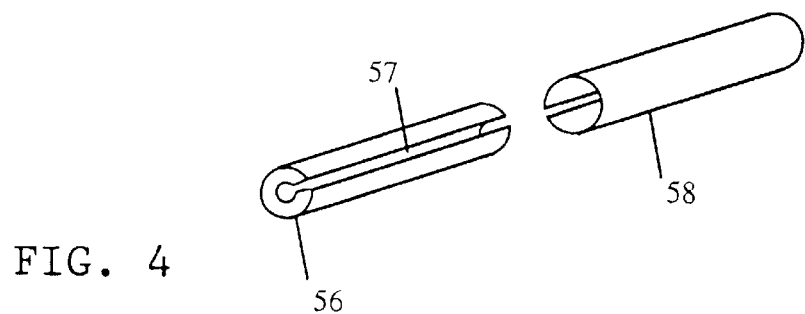
FIG. 4 is a three-dimensional view of two components of a preferred clamping device.

An example of a preferred clamp is depicted in FIG. 4. The clamp 56 is injection molded to have an inner diameter that is slightly smaller than the outer diameter of the fiber used. The fiber is slipped into the clamp through slit 57. A suitable locking mechanism 58 then closes the clamp, which is of sufficient length (typically 1 to 3 cm) to ensure that slippage is avoided. The clamps can be mounted at any desired location on the fiber.

2. PRE-BENDING THE SENSOR

A pre-bent configuration of the sensor could be manufactured by employing robotic devices programmed to provide precisely identical configurations automatically in large quantities.

3. EXTERNAL ATTACHMENT TUBES ON THE FIBERS

It is easiest to first ensure that the fiber will bend in the desired way and to then deal with the attachment problem since it is important to ensure the boundary conditions.

Figure 5:
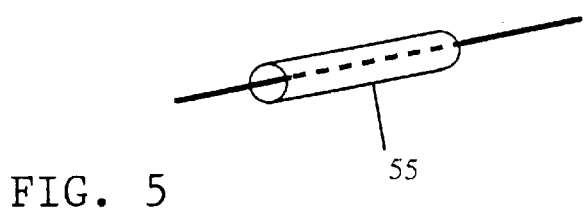
FIG. 5 is a three-dimensional view presenting the location of the fiber within an attachment tube.
Figure 6:
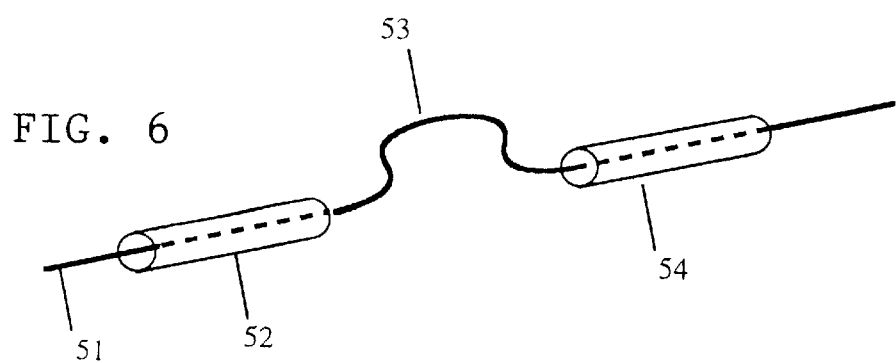
FIG. 6 is a three-dimensional view of the sensing part of the fiber with attachments illustrating where the attachments are relative to the fiber.

Basically, this means that we first coaxially attach small pieces of tubing 55 to the fiber (FIG. 5) (inner diameters of slightly more than the diameter of the fiber; we are using 23 gauge hypo tubes for 50-125 acrylate coated fiber), and to later clamp onto these tubes to displace the sensor. FIG. 6 illustrates how the fiber 51 enters tubes 52 and 54 and is bent into shape 53 between them. This technique ensures control in satisfaction of the boundary conditions. The technique also allows for the easy transportation of fiber with sensors already built onto it, since the small tubes 55 do not greatly interfere with winding the fiber onto a spool.

Once the two attachment points 55 are connected to the fiber, making an operational sensor requires only moving these two attachment points in a controlled way. This can be achieved by a mounting mechanism to secure the fiber and tubes to the structure in question.

Figure 7:
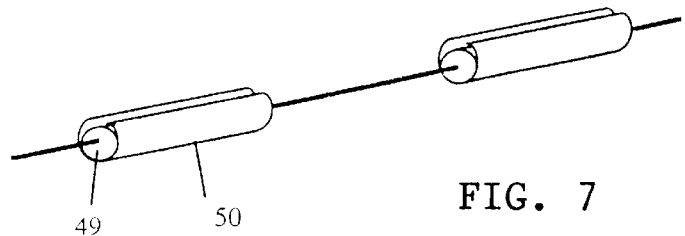
FIG. 7 is a three-dimensional view of how expansion pins are used in the construction process of the sensors.

We have found that it is sometimes easier to replace the closed tubes 55 with expansion pins 50 of smaller inner diameters (see FIG. 7). The small slot allows us to slip the fiber into the expansion pins at any location along the whole fiber, instead of having to pull great lengths of fiber through a small tube. The fibers are secured using cement 49.

Figure 8:
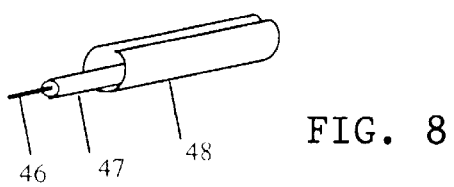
FIG. 8 is a three-dimensional view of an alternative attachment method utilizing a small tube and an expansion pin.

One can also employ two different hypo-tubes mounted inside each other (see FIG. 8). Two inner tubes 47 (23 gauge) are slid over the fiber 46, and the fiber is attached to them at the desired locations. The small inner diameter of these tubes 47 ensures that the fiber is centered and oriented coaxially. Since these tubes are thin walled and compress under excess stress, two expansion pins 48 are then cemented over the inner tubes to provide additional strength. The final assembly is depicted in FIG. 8.

Figures 9A, 9B:
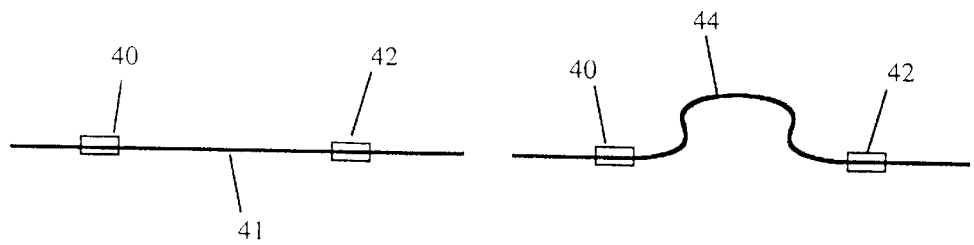
FIG. 9, which comprises FIGS. 9a and 9b, indicates the two steps used in yet another attachment method.

Another technique shown (see FIG. 9) is to first mount two small hollow tubes 40, 42 to the structure or mounting device at specific locations. The fiber 41 is fed through both tubes 40, 42, and attached permanently to one of them (40). Afterwards, excess fiber is fed into the other tube 42. The fiber 44 between tubes 40 and 42 will again take on the characteristic shape. During the process the transmission/reflection loss of the fiber is monitored until the desired loss is achieved. Then the fiber is attached to the second tube. FIG. 9 illustrates this procedure.

4. USING TUBING

Figure 10:
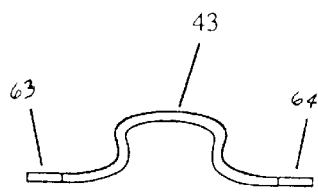
FIG. 10 is a view of a pre-bent tube section of the sensor used in another alternative attachment method.

A different approach is to first install tubing 43 (see FIG. 10) in the desired shape and to later insert fiber into this tubing. FIG. 10 indicates the procedure to be used. Advantages are that the tubing is easier to bend and that one can avoid installing the fiber until most of the system is assembled. Another possibility is to use tubing that is pre-shaped (and thus of specified length and curvature). This will:

(a) eliminate problems of having to deal with fiber that is under tension due to displacement; and (b) ensure reproducibility. Examples of tubing that can be used include PEEK (poly ether-ether-ketone) or polymide. Non-resilient clamps 63 and 64 define the attachment points.

EXPERIMENTAL RESULTS

We now describe the experimental setup, how to perform transmission and reflection experiments, and some typical results to provide an idea of the capabilities of the inventive sensors. More detailed results for both transmission and reflection experiments follow.

EXPERIMENTAL SETUP

The sensors are mounted on two sides of a gap of controllable size and the signal is monitored as a function of the gap size.

Figure 11:
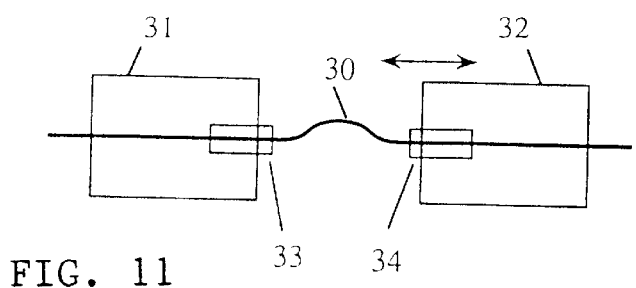
FIG. 11 is a block diagram illustrating the experimental setup used for measuring the response of sensors in one dimension and which setup is used for taking data presented in FIG. 12 through FIG. 21.

As shown in FIG. 11, we mounted the sensor 30 at 90 degrees to the gap axis. The distance between the two attachment points 33, 34 of the sensor was controlled using a Oriel Model 18011 motorized stage 32 that has a resolution of 0.1 μm. One of the two attachments was driven, while the other, 31, was held stationary.

TRANSMISSION EXPERIMENTS

In doing transmission experiments with the inventive sensors one needs to ensure mode stripping of multi-mode fibers both before and after the sensor. The light source should also be specified because the response of the sensor is wavelength dependent.

Two different light sources were used for the experiments described, an Aab Hafo 1A191 LED adapted for connection to a fiber, operating at a nominal wavelength of 844 nm and an incandescent light bulb (CUDA Model I-150).

The fibers were always in an overfilled launch condition. Mode stripping was achieved either by using a very long (1 km) lead-in or by adding a mode-stripper (10 turns on a 1.2 cm diameter mandrel).

TYPICAL RESULTS

Figure 12:
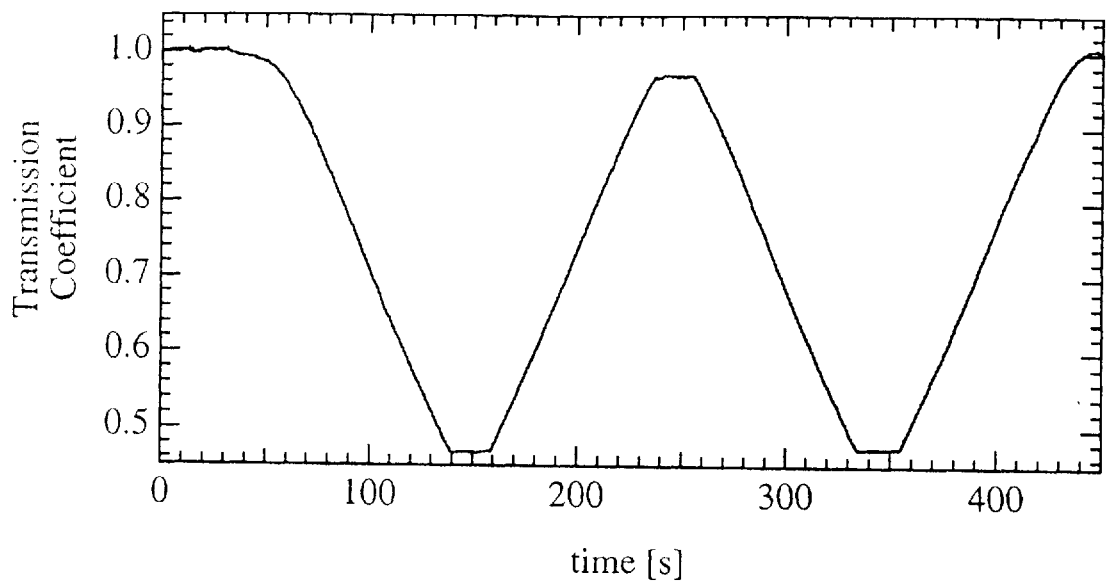
FIG. 12 is a graphical representation of transmission data taken using the setup shown in FIG. 11.
Figure 13:
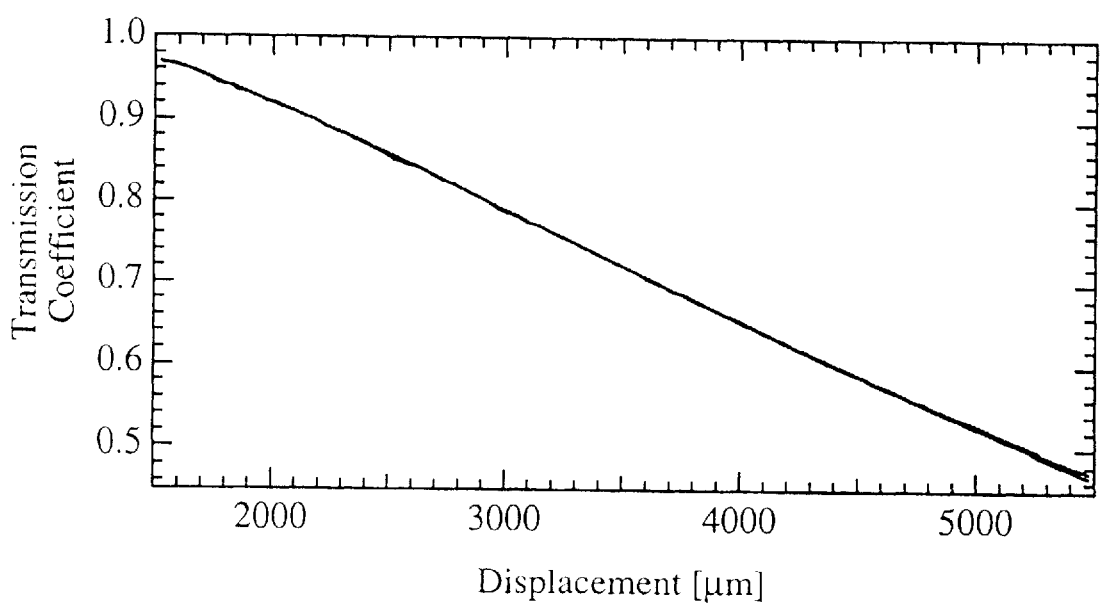
FIG. 13 provides a summary of the data shown in FIG. 12.

FIG. 12 presents the transmission coefficient of a $L_o=15$ mm α sensor made using 50-125 multi-mode fiber (MMF) buffered by poly-acrylate (PA) and alternately displaced by plus and minus 50 $\mu$m/s with data collected at 2 Hz. The sensor was illuminated with a CUDA incandescent light source and the signal was directed onto a Si PIN photodiode. FIG. 13 presents the same data versus the displacement from full extension; the linearity and reproducibility of the sensor is evident. Note the large sensing range (>25% strain). The sensor can be displaced further without damage. The laws describing the scaling factors of the sensor will be presented below.

REFLECTION EXPERIMENTS

Reflection data were taken using a Tektronix TFP2 Fibermaster OTDR operating at 850 nm. Generally, data were taken with 3, 8 or 20 ns pulse lengths and averaged 4096 times before saving them on disk.

TYPICAL RESULTS

Figure 14:
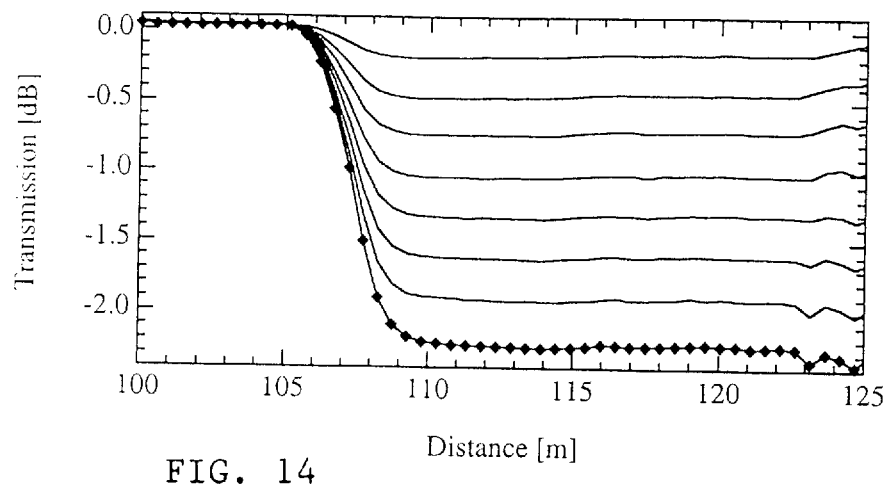
FIG. 14 is a graphical representation of reflection data taken using the setup shown in FIG. 11.
Figure 15:
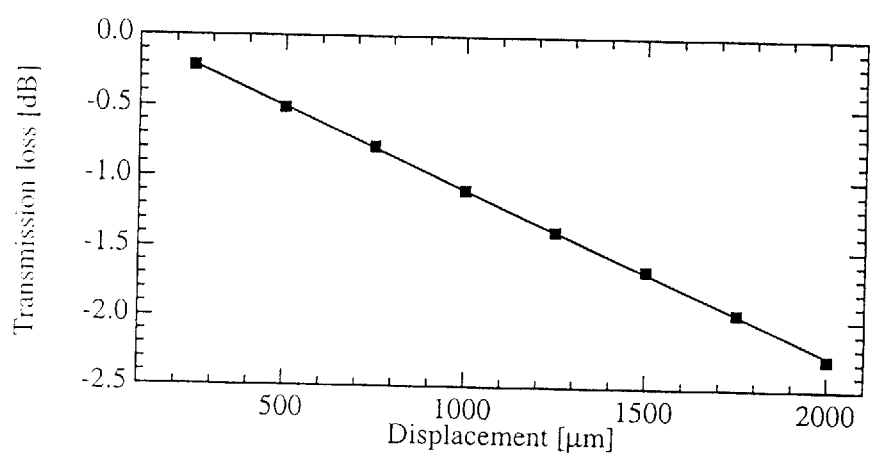
FIG. 15 provides a summary of the data shown in FIG. 14 and presents a linear fit to that data.

FIG. 14 presents the OTDR data (20 ns. pulse length; 4096 averages) of an Ω sensor of length $L_o=15$ mm made using 50-125 multi-mode fiber (MMF) buffered by a thin (~10 microns) coating of gold. The sensor was displaced in steps of 250 $\mu$m from 0 to 2000 $\mu$m. The left hand scale displays the induced loss across the sensors. The bottom axis illustrates the distance of the sensor from the OTDR machine. FIG. 15 summarizes the data from FIG. 14 by displaying the size of the sensor transmission loss versus the displacement. The linearity and large sensing range of the sensor are demonstrated.

DIFFERENT LIGHT SOURCES

Figure 16:
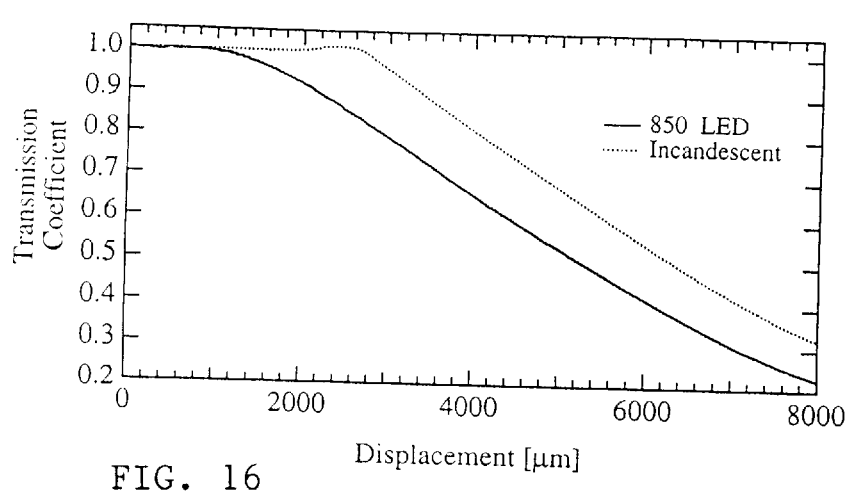
FIG. 16 is a graph of transmission data taken using two different light sources.

Changing the light source from the 840 nm LED to an incandescent lamp changes the response of the sensor appreciably, as is indicated by FIG. 16 which compares the response of an $L_o=15$ mm 50-125 MMF Ω sensor under these different illumination conditions. In both cases, the sensor only responded after a certain amount of displacement had been applied; however, that amount of displacement depends upon the wavelength of the light source used. Note that the LED light source has a larger sensing range than the white light and that the slope of the response curve is about 10% steeper for the white light. The source dependency of the response is expected.

DIFFERENT MOUNTING CONDITIONS

Figure 17:
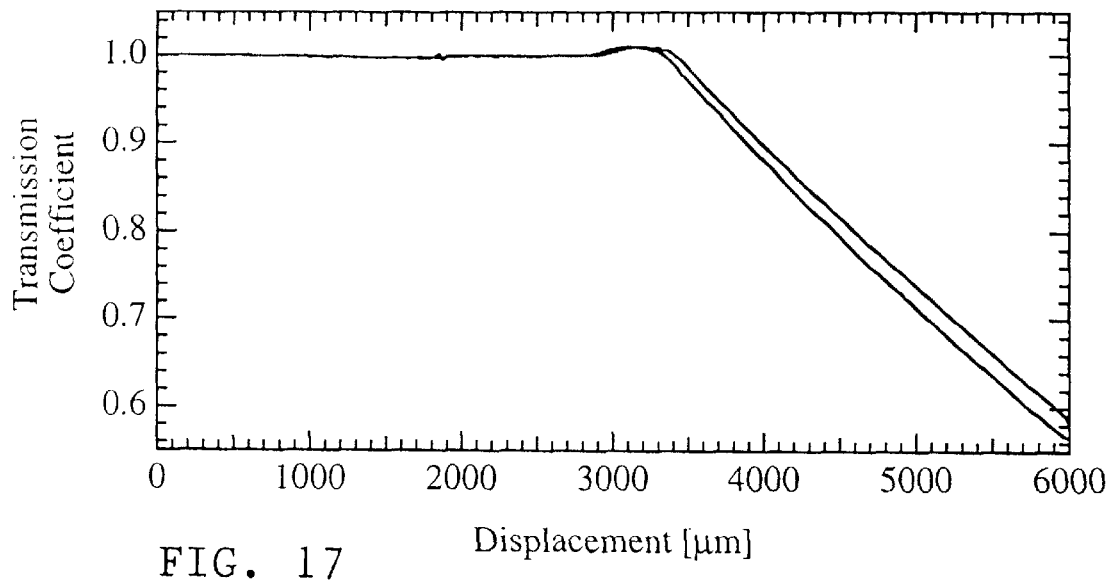
FIG. 17 is a graphical representation of a comparison of transmission data taken under slightly different mounting conditions.

The effects of varying mounting conditions were tested on Ω sensors by measuring a response, then unmounting and remounting the sensor, and taking the data a second time. Results are presented in FIG. 17.

The differences in the mounting conditions show up in the slightly different responses. However, it is important to note that the relative sensitivity (the slope of the sensor) is not affected by these conditions. Ω sensors can thus be calibrated in situ to give absolute responses, or directly used to indicate relative responses.

WAVELENGTH DEPENDENCE OF THE SENSOR RESPONSE

Figure 18:
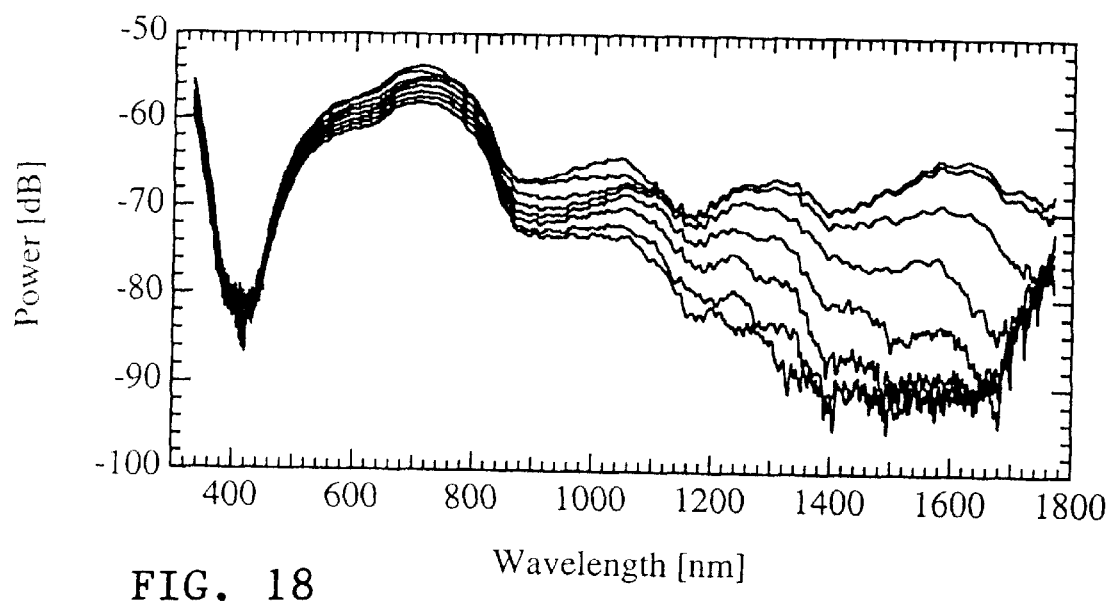
FIG. 18 is a graphical representation of transmission data as a function of the wavelength used in illumination of the sensor for various amounts of displacement.

The wavelength dependence of the Ω sensor response was studied as a function of displacement. Measurements were taken with an ANDO AQ-6315B Optical Spectrum Analyzer and the CUDA incandescent light source. The sensor was fabricated from Corning SMF28 fiber and had a straight length $L_o=10$ mm. The sensor was displaced in increments of 100 $\mu$m from 0 to 1500 $\mu$m. FIG. 18 presents the transmitted power measurements in steps of 200 $\mu$m.

Figure 19A:
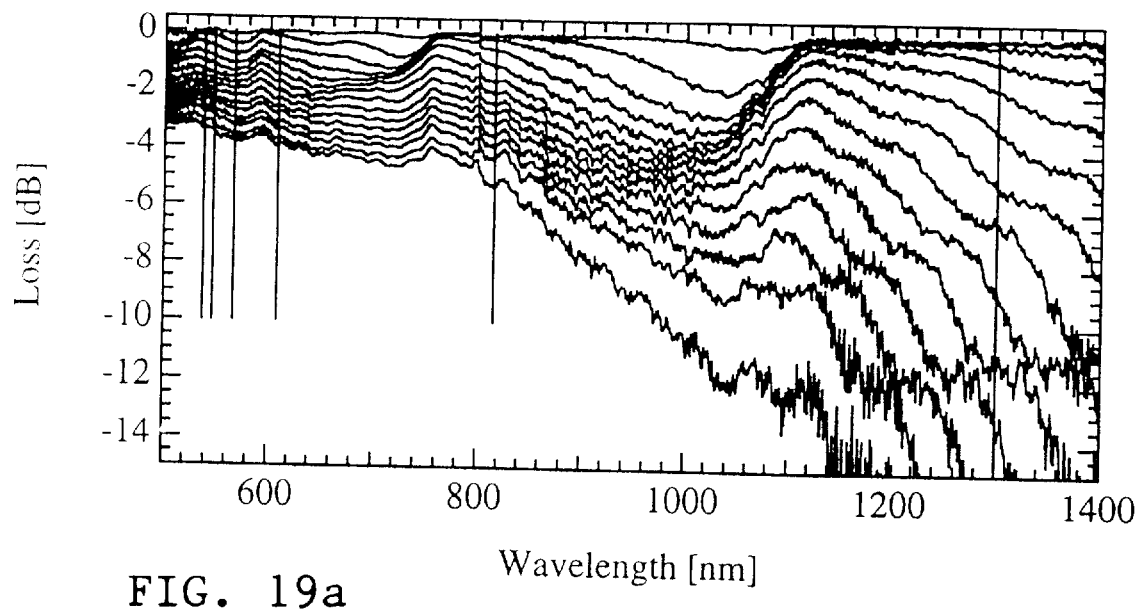
FIG. 19, which comprises FIGS. 19a and 19b, provide a summary of the data presented in FIG. 18 shown on two different scales.
Figure 19B:
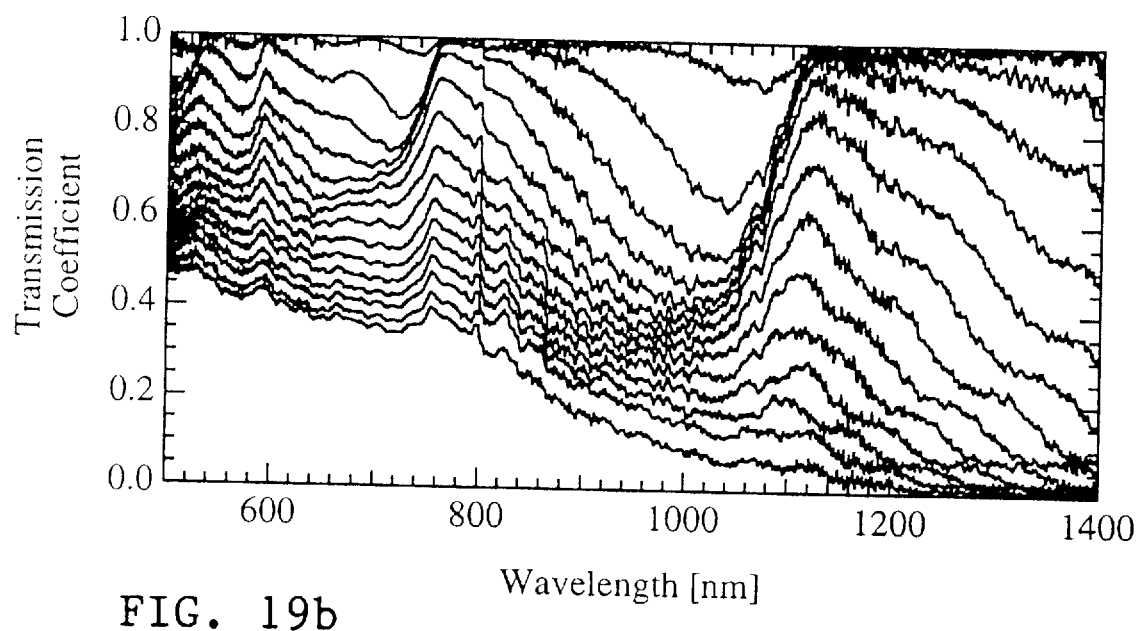

FIGS. 19a and 19b show the wavelength dependence of the sensor-induced loss on two different scales (logarithmic and linear). This was done by normalizing each spectrum for a given displacement with respect to the spectrum for zero displacement. The vertical lines in FIG. 19a correspond to the cutoff wavelengths for successively higher order propagating modes. The fiber only propagates a single mode for wavelengths longer than approximately 1280 nm, two modes between 1280 nm and 810 nm, and so on.

Figure 20:
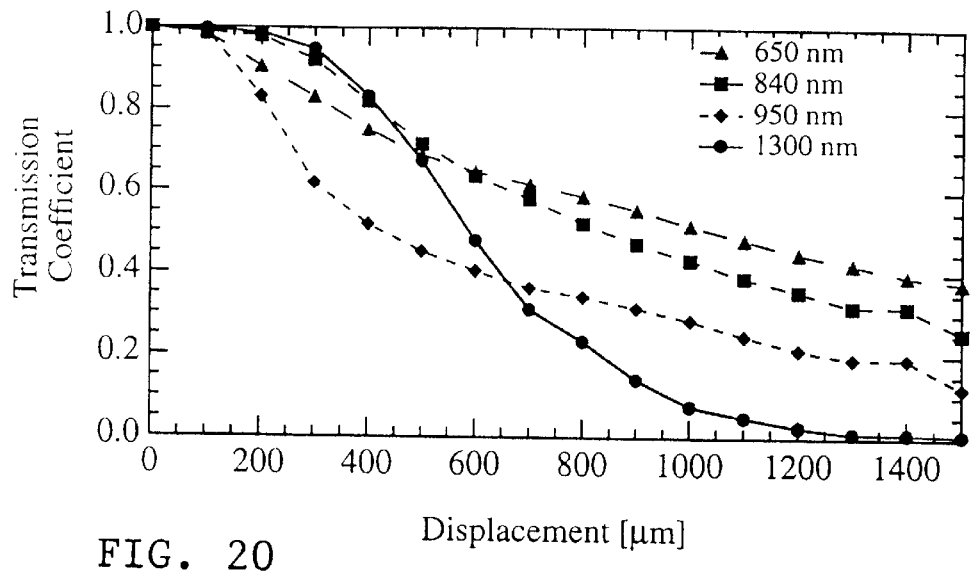
FIG. 20 provides a partial summary of the data presented in FIG. 19, for various selected wavelengths.

As can be seen clearly in FIG. 19, the sensor response varies considerably as a function of wavelength. FIG. 20 summarizes the sensor response for the four wavelengths of 650 nm, 840 nm, 950 nm and 1300 nm, which are quite different. For example, between 400 $\mu$m and 700 $\mu$m displacement, the slope of the response at 1300 nm is $-1.7 \times 10^{-3}/\mu$m and the slope at 840 nm is $-7.9 \times 10^{-4}/\mu$m. This wavelength dependent response can be used to great advantage in practical situations. An example would be that by selecting the wavelength at which the sensor is interrogated, one can achieve a high response for various displacements and extend the sensing range of the sensor.

COMPARING TRANSMISSION AND REFLECTION MEASUREMENTS

We compared transmission and reflection measurements on an $L_o=10$ mm 50-125 polyacrylate buffered MMF Ω sensor. The transmission data were taken using 840 nm LED as a light source and the reflection data using a Tektronix TPF2 FiberMaster operating at 850 nm with a pulse length of 8 ns and averaged over 4096 scans. The sensor was compressed in successive increments of 250 $\mu$m.

Figure 21:
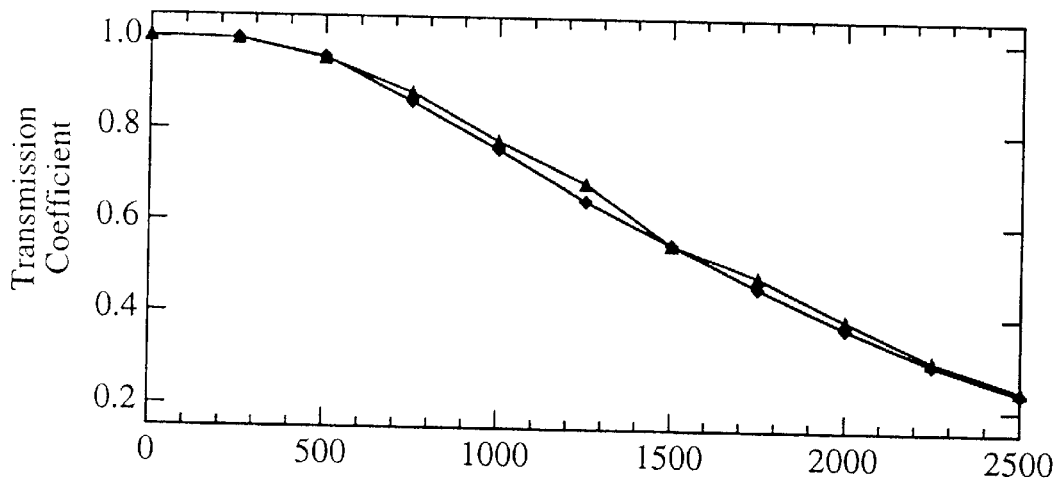
FIG. 21 is a graphical representation of a comparison of transmission and reflection data.

FIG. 21 compares the results due to transmission and reflection measurements. In order to compare the two measurements, we converted the reflection data (triangles) in dB into transmission data (squares) using $$T = 10^{-R/10} \tag{9}$$

where R are the reflection data. As can be seen, the correspondence between the different measurement methods is excellent.

SCALING LAWS

There are certain scaling laws that have been experimentally found for Ω sensors which enable a theoretical understanding of the response of these sensors. We investigated the specific case of 50-125 polyacrylate buffered multi-mode fiber under illumination by an 840 nm LED.

EXPERIMENTAL SETUP

Figure 22:
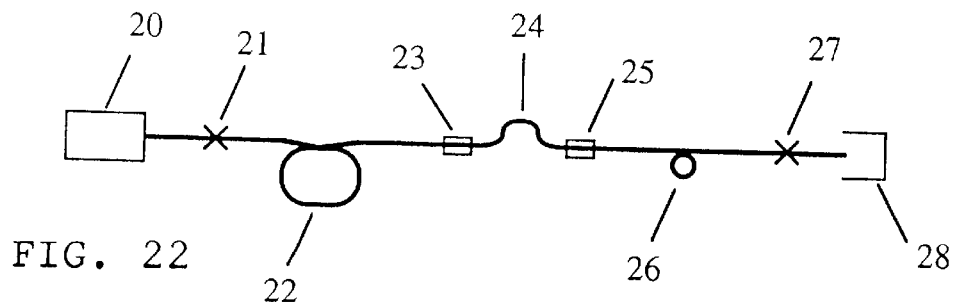
FIG. 22 is a block diagram of the setup for measurement of the data shown in FIG. 23 through FIG. 26.

With reference to FIG. 22, a setup in which four sensors (of lengths $L_o$=5 mm, 10 mm, 15 mm and 20 mm) was built all within 1 m on a polyacrylate buffered 50-125 MMF fiber. Light was injected from 840 nm LED 20 and passed through a mode stripper 22 consisting of a 1 km long segment of 50-125 MMF to remove cladding modes, then injected into the segment of fiber containing the four sensors 24, passed through a second mode stripper 26 consisting of 10 turns on a 1.5 cm diameter mandrel and finally directed onto a silicon photodetector 28. Splices 21 and 27 connect the sensors to the other parts of the setup. The four different sensors were thus exposed to identical optical conditions. Each sensor uses attachment point 23 and 25.

RESULTS

Figure 23:
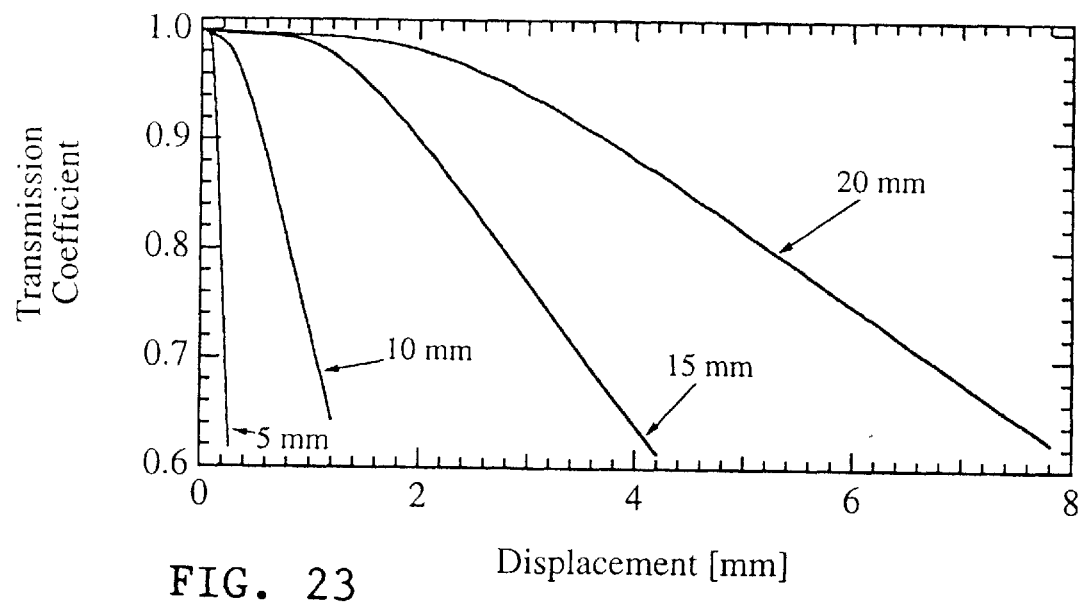
FIG. 23 is a graphical representation of transmission data taken for Ω sensors of four different fully extended lengths $L_o$.

The results of the measurements are presented in FIG. 23 which shows the transmission coefficient of the four different sensors versus the displacement to which they are exposed. The four curves are, from left to right, ordered in increasing $L_o$. We see that the $L_o$=5 mm sensor is much more sensitive than the $L_o$=20 mm sensor, but that it also has a much smaller sensing range.

DEFINITION OF THE THRESHOLD DISPLACEMENT

Figure 24:
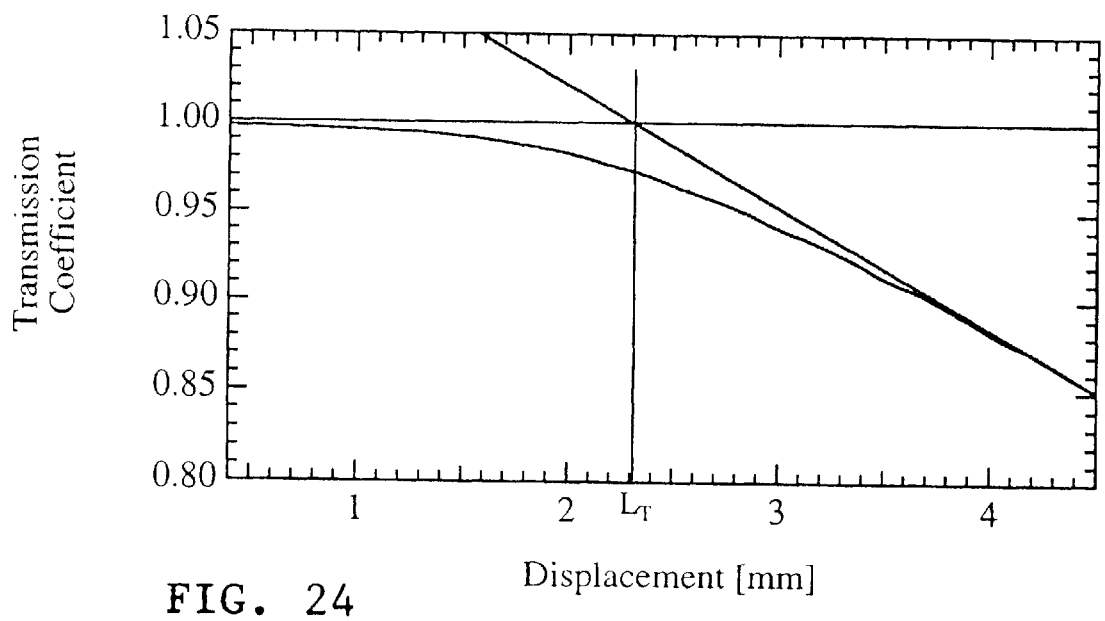
FIG. 24 is an expansion of data presented in FIG. 23 and illustrates how to find a threshold length $L_t$.

We proceed to show that these four curves scale, i.e., that there is a general law describing the loss of an Ω sensor. In order to do so, we define a threshold displacement $L_t$ as the displacement at which the two asymptotes of a loss curve (the flat initial region and the linear loss) intersect. FIG. 24 demonstrates how to determine the location of the threshold displacement $L_t$ for the case of the $L_o$=20 mm sensor.

For all the studied sensor lengths we found that the signal at the corresponding threshold displacements was between 97.2% and 97.3% of the maximum transmission of the sensor.

TRANSMISSION VS. SCALED DISPLACEMENT

Figure 25:
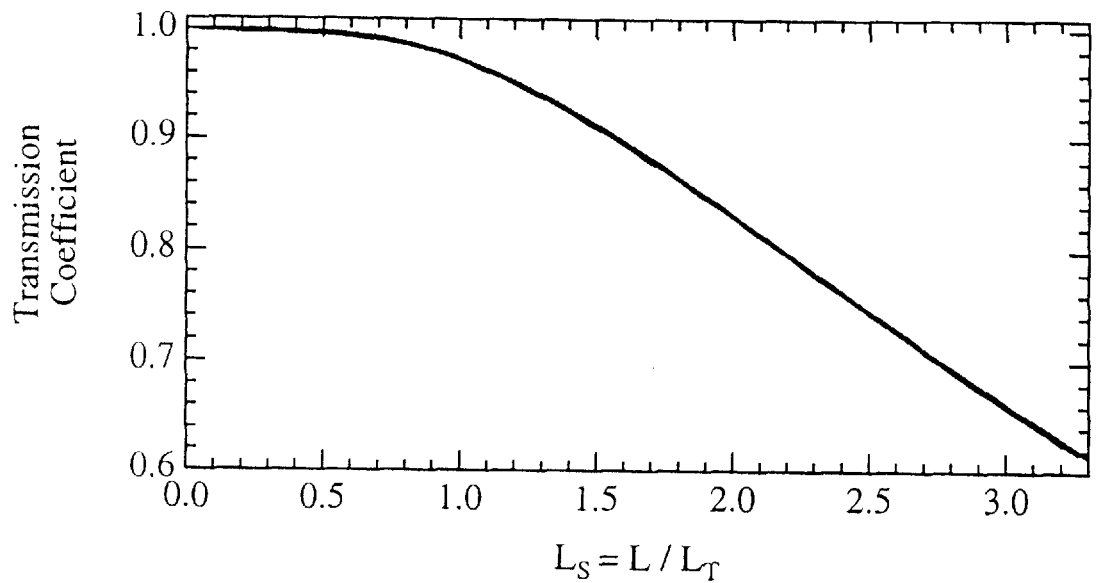
FIG. 25 is a graphical representation of the data presented in FIG. 23 using the threshold length $L_t$ of FIG. 24.

We now define a scaled displacement $L_s$ as the displacement L of the sensor divided by the corresponding threshold displacement $L_t$, i.e., $L_s=L/L_t$. Upon plotting the transmission coefficients of all four sensors vs. this scaled displacement, we see that the four curves overlap very well (FIG. 25).

We find that there is a universal law that describes the response of an Ω sensor if the displacement is measured as a scaled displacement.

Empirically, we find that the threshold displacement $L_t$ for 50-125 polyacrylate buffered MMF at 840 nm illumination of a sensor depends on the unstretched length $L_o$ of the sensor in a power-law fashion:

$$L_T[\mu m]=1.63\, L_0[mm]^{2.44} \quad (10)$$

Figure 26:
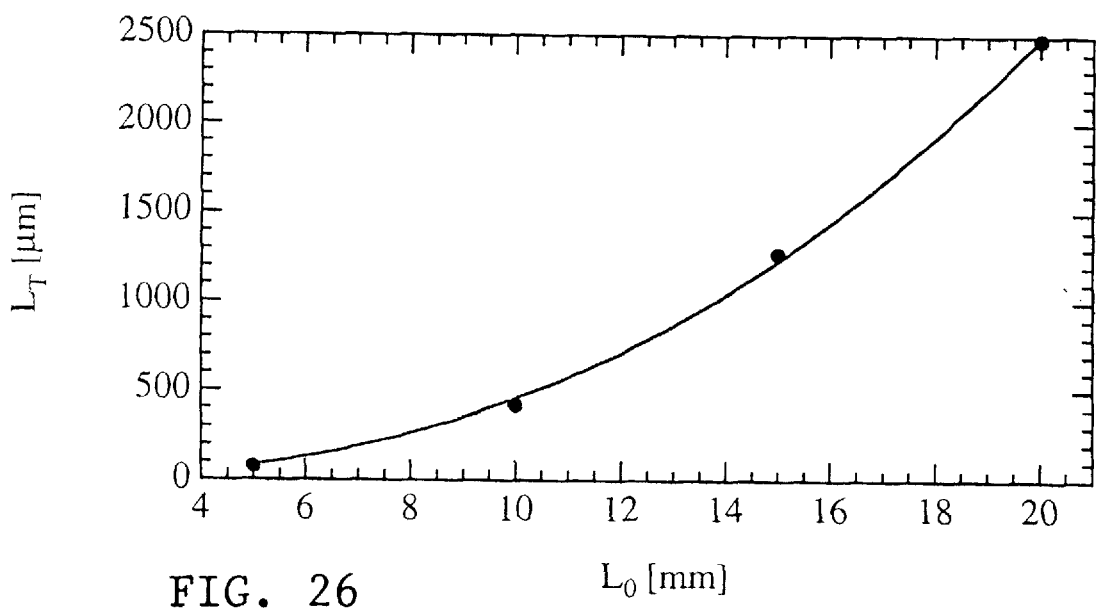
FIG. 26 is a graphical representation of the relation between the extended sensor length $L_o$ and the threshold length $L_t$.

FIG. 26 demonstrates that this relationship (solid line) and the empirical data (dots) coincide well.

CORRELATION BETWEEN SCALED LENGTH AND OVERALL SHAPE AND LOCAL CURVATURE

Figure 27:
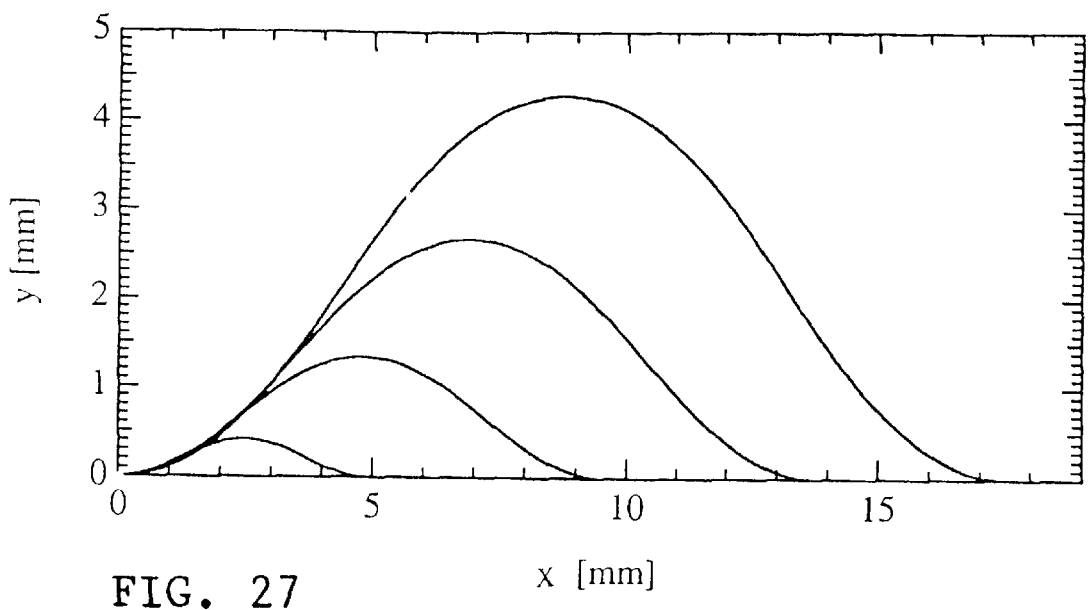
FIG. 27 is a graphical representation of the shapes that four various length sensors assume when displaced by their respective threshold lengths.

In order to understand why sensors of identical scaled length $L_s$ (but different overall length $L_o$) have the same transmission loss, we plotted the shape of the four different sensors studied when compressed to a scaled length of $L_s$=1. FIG. 27 represents the results of this calculation.

Figure 28:
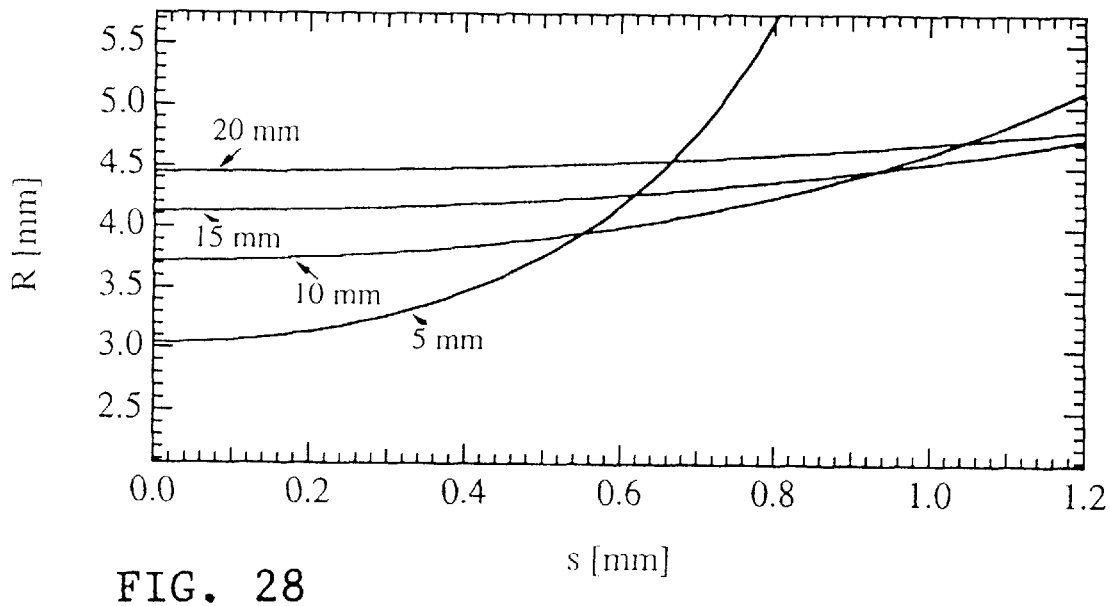
FIG. 28 is a graphical representation of the radii of curvature of same four sensors along the initial part of the fiber.

We see that the sensors overlap (have similar radii of curvature) in the part of the sensor adjacent to the attachment point. By symmetry of the Ω shape function, the radii of curvature are identical for a given sensor at points A, C and E of FIG. 1 and all locations that are at identical distances from these points. FIG. 28 presents the local radii of curvature along the sensors out to s=1.2 mm from point A.

SIMPLIFIED MODEL FOR THE TRANSMISSION RESPONSE OF AN Ω SENSOR

The normalized general response of an Ω sensor made from 50-125 MMF-PA can thus be described in detail using a general model which has 3 distinct regions:
1) An initial linear region for displacement less than threshold $L_t$ of very small sensitivity (from $L_s$=0 to 0.75);
2) A linear region of high sensitivity (between $L_s$=1.5 and 3); and
3) A cross-over region between these two linear regions.

We approximate the intermediate region as having a linear response. Least square fits to the scaled sensor response curves, yield the following relationship between the transmission coefficient T and the scaled displacement $L_s$:

$$T=1.00-0.01\, L_s,\ 0\leq L_s \leq 0.6$$
$$T=1.07-0.11\, L_s,\ 0.6\leq L_s \leq 1.5$$
$$T=1.16-0.17\, L_s,\ 1.5\leq L_s \leq 3.5 \quad (11)$$

Figure 29:
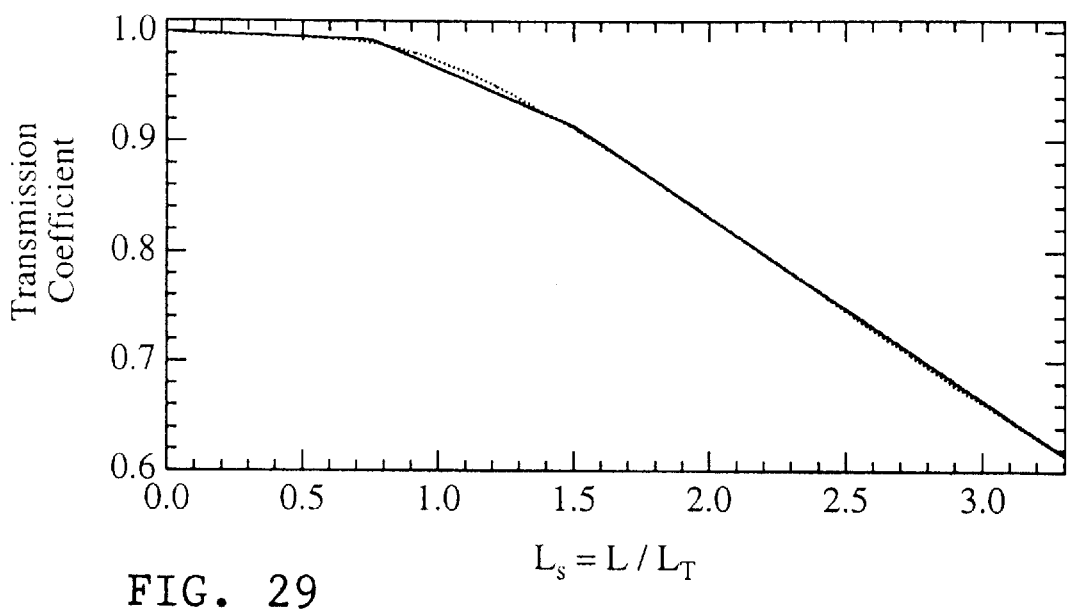
FIG. 29 is a graphical representation comparing the response of an Ω-type sensor of length $L_o$=20 mm with a model.

FIG. 29 represents this idealized response (solid line) as well as the actual response of the $L_o$=20 mm sensor (dashed line) showing the agreement with the simple model. For compression of more than $L_s$=4, the sensor response flattens out (see FIG. 21).

CONCLUSIONS FROM THE SCALING LAWS

Based upon the foregoing:

1) Ω sensors (at least those made out of 50-125 polyacrylate coated MMF and illuminated by an 840 nm LED) have a universal response curve that depends only on the amount by which they have been compressed and their overall uncompressed length $L_o$;

2) It is possible to custom-design sensors for specific applications. Based on the relation between sensitivity and range for Ω sensors. Thus, for any desired sensitivity, we can predict the range of the sensor. We can also find the optimal initial displacement that will allow a linear response over that range;

3) Although not presented here, the response of an sensor is highly sensitive to the amount of cladding light present. The sensors will be more sensitive (i.e., have a larger change in transmission for the same amount of displacement) if cladding modes are present. This is why we need to ensure that all cladding modes are taken into account. In certain circumstances cladding mode excitation prior to a sensor may be used to enhance the sensitivity even further.

OMNI-DIRECTIONAL OFFSET SENSOR

Figure 30A:
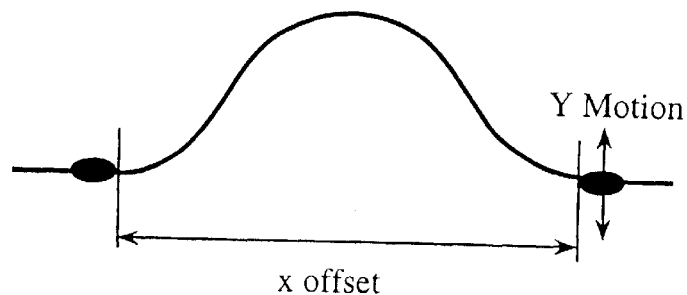
FIG. 30, which comprises FIGS. 30a and 30b, indicates the two principal directions in which an sensor can be displaced in the so-called "offset-parallel" configuration.
Figure 30B:
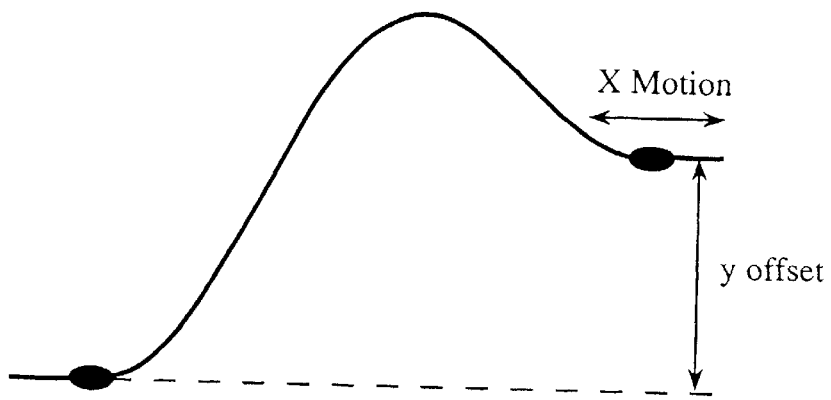

One can also build Ω sensors with attachment points that are offset from parallel. FIG. 30, which comprises FIG. 30a and 30b, represents an implementation of this design. One can then measure displacements in either the y-direction (FIG. 30a) or the x-direction (FIG. 30b), as well as any combination of these displacements.

Figure 31:
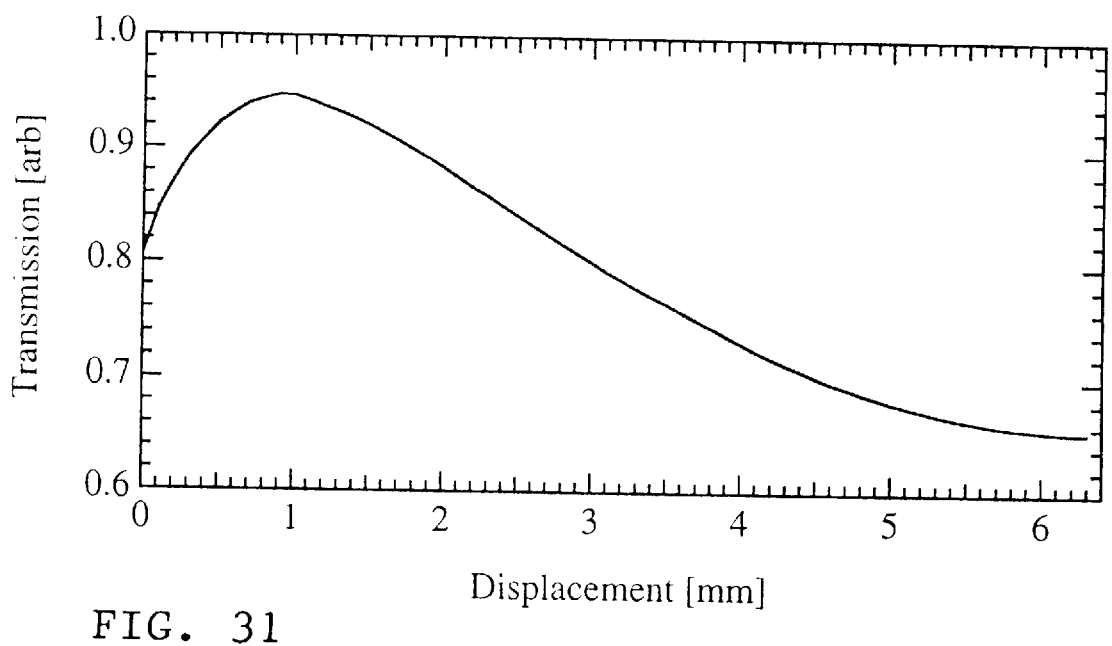
FIG. 31 is a graphical representation of transmission data taken using the fiber configuration in FIG. 30b.

FIG. 31 is a graphical representation of data taken in the configuration of FIG. 30a. The measured sensor was made from 50-125 PA MMF and illuminated by white light. The sensor with an $L_o$ of 10 mm was displaced by $\Delta x$=2.5 mm; data were taken for motion in the y-direction.

OMNI-DIRECTIONAL—90 DEGREES

Figure 32:
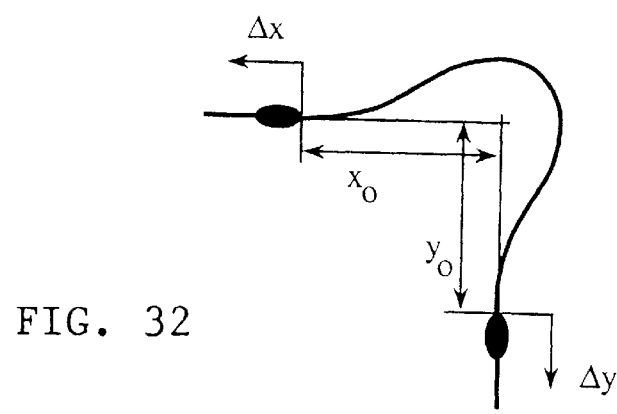
FIG. 32 is a view of the sensing portion of the fiber on an Ω sensor in the so-called "90 degree" configuration.

One can also mount the inventive sensors so that their displacement does not occur along the principal axis joining the two attachment points. A specialized mounting condition (at 90 degrees) is depicted in FIG. 32. For this mounting condition, any relative displacement of the two attachments can be described as a displacement of one of the two in the x-direction, while the other is moving in the y-direction.

The advantage of such a mount is that a crack that occurs in an arbitrary direction between the two attachment points will change the relative displacement of one with respect to the other. This will result in a change in the shape of the sensor, which, in turn, will change the transmission properties. While it will be impossible to determine the exact relative motion (two variables) from the output of the sensor (one variable), the sensor can determine the fact that some movement has taken place and the amount of that movement.

Figure 33A:
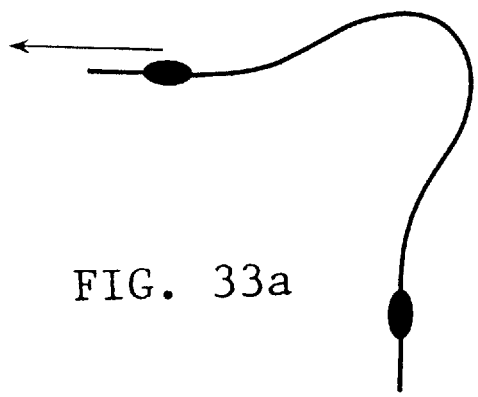
FIGS. 33a and 33b, presents two of the shapes that the sensor of FIG. 32 assumes under specific displacements.
Figure 33B:
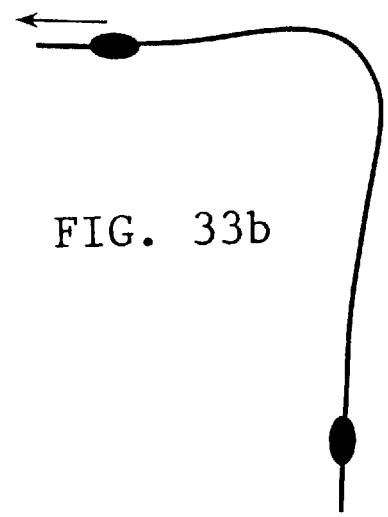

Examples of possible relative motion are presented in FIGS. 33a and 33b. The arrow indicates the motion for which measured data are presented in FIG. 34a. FIG. 33b shows the shape of the sensor after one of the two attachment points has been displaced substantially. Again, the arrow refers to the motion for which data were taken and as presented in FIG. 34b.

Figure 34A:
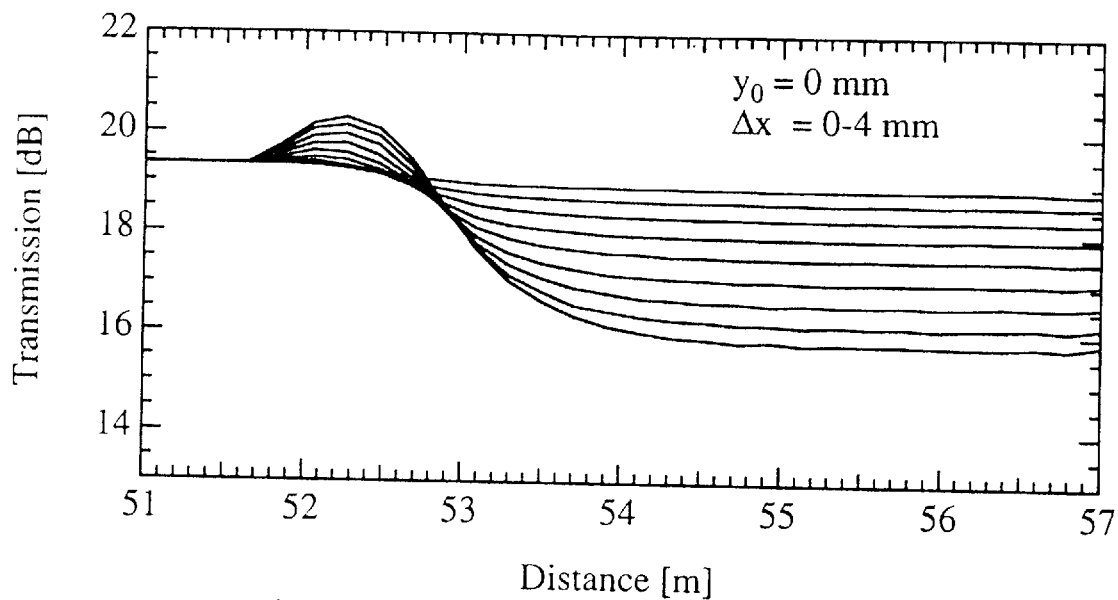
FIGS. 34a and 34b, is a graphical representation of reflection data taken utilizing the fiber configuration presented in FIGS. 33a and 33b.
Figure 34B:
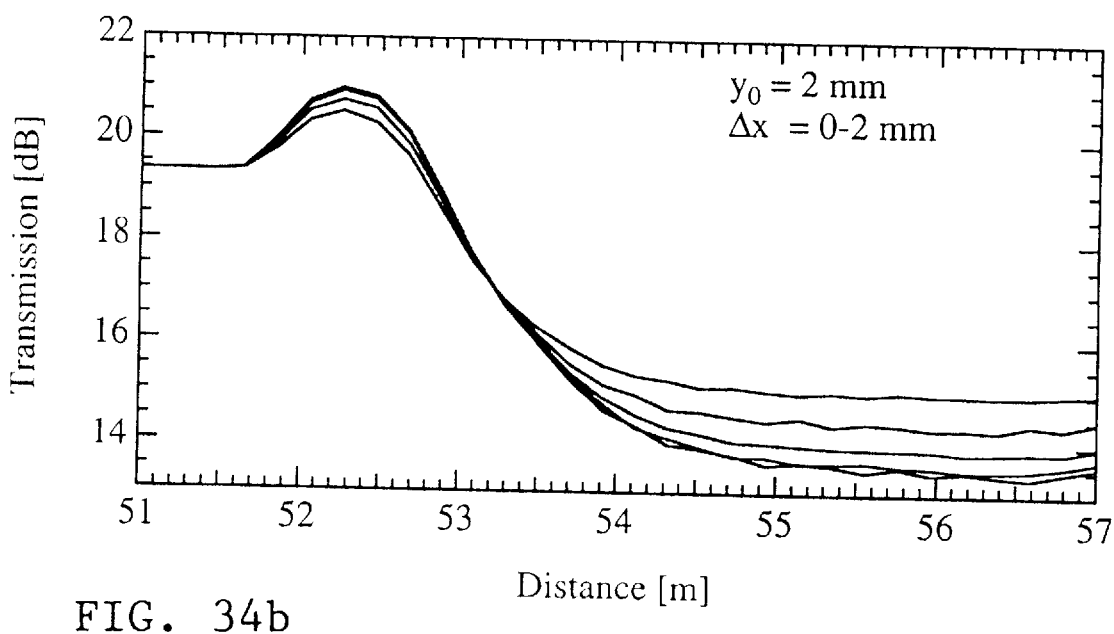

The data presented in FIGS. 34a and 34b were taken using 50-125 polyacrylate MMF fiber. The initial separation of the attachment points was $x_o$=4 mm and $y_o$=4 mm. All motion studied resulted in an increase in this separation. In FIG. 34a the x-attachment is moved by up to 4 mm further in the direction indicated in FIG. 33a. Data were taken every 500 $\mu$m of displacement and are presented in FIG. 34a.

The sensor was then returned to its original position, the y-attachment moved by 2 mm, and data taken while the x-attachment was moved by up to 2 mm. Data were taken every 500 $\mu$m of displacement and are presented in FIG. 34b.

Figure 35:
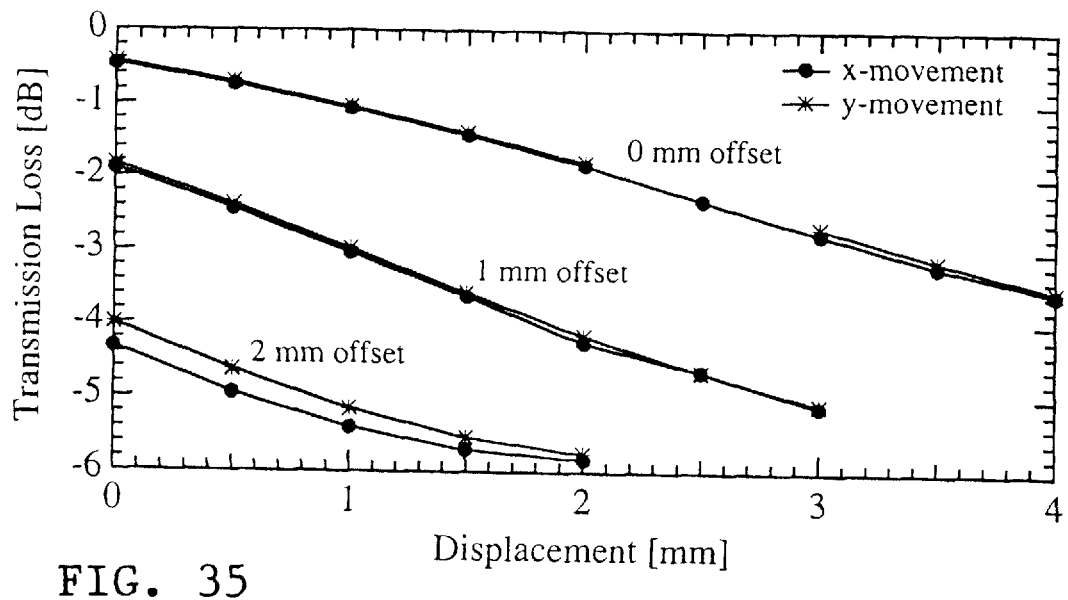
FIG. 35 provides a graphical summary of various data taken using the fiber configuration presented in FIGS. 33a and 33b.

FIG. 35 combines all the data taken. Either the x-attachment or the y-attachment was offset by 0, 1 or 2 mm from $x_o$ or $y_o$, respectively. Data were then taken for displacements in the y-direction and x-direction, respectively.

As can be seen in FIG. 35, the sensor response is independent of which attachment was offset and which one was moved, as expected from symmetry considerations. The sensor is thus capable of detecting arbitrary crack directions.

Figure 36A:
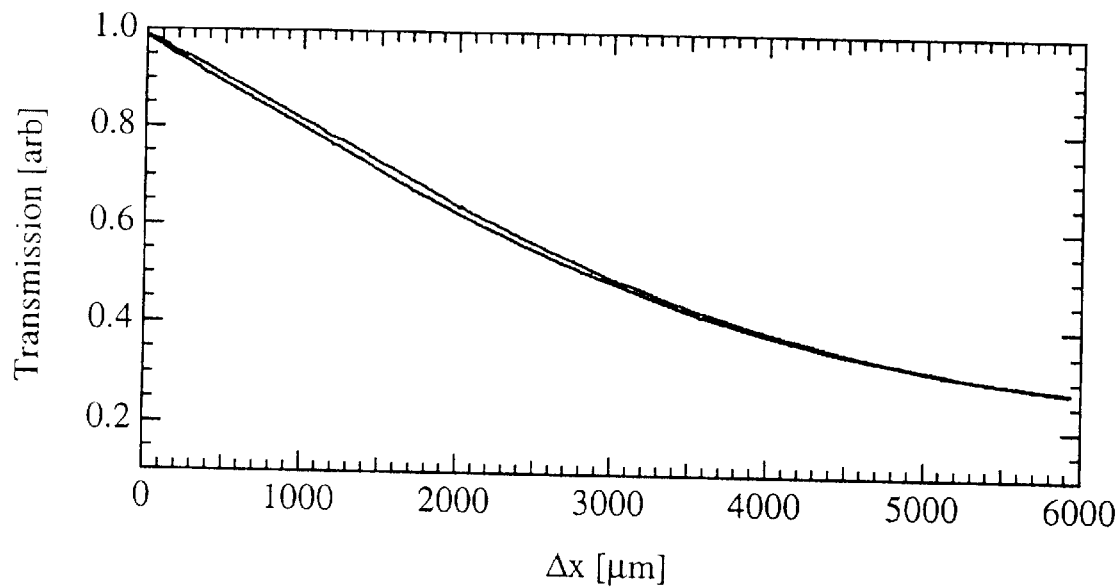
FIGS. 36a and 36b, is a graphical representation of transmission data taken utilizing the fiber configuration presented in FIGS. 33a and 33b.
Figure 36B:
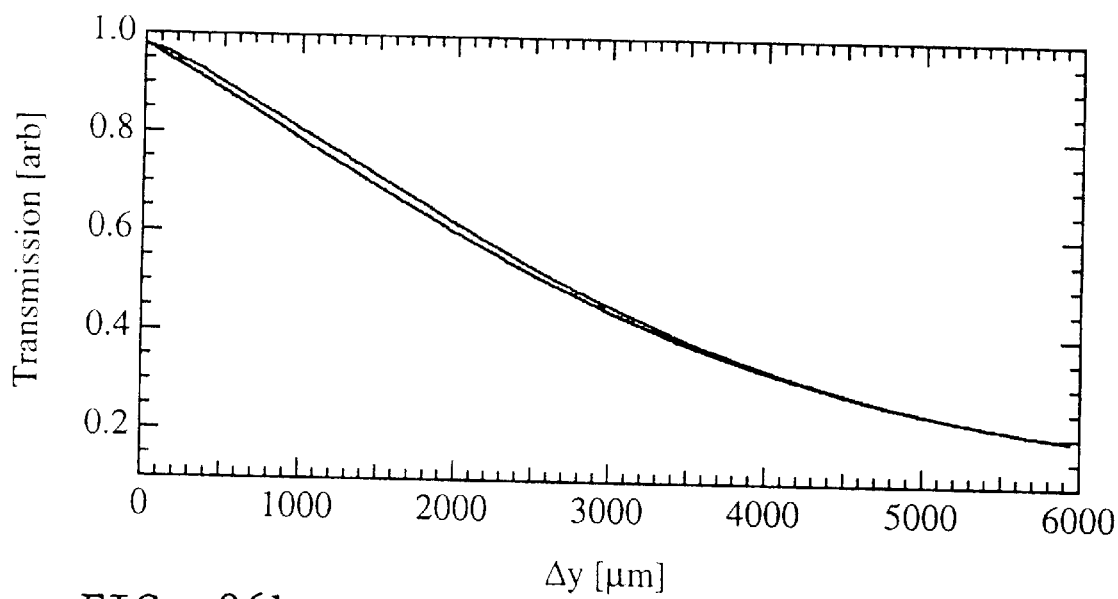

Further confirmation of the omni-directional response characteristics of the 90 degrees $\Omega$-type sensor shown in FIG. 32, is shown in FIGS. 36a and 36b, where the same sensor as described above was measured in transmission using the CUDA white light source.

FIG. 36 shows that x and y-displacements have nearly identical optical responses with minimal hysteresis. No special precautions were taken to ensure that the sensor was fabricated symmetrically. The small residual difference in response between increasing and decreasing displacements is believed to be due to backlash in the micropositioning stages used.

TWO MODE SENSORS

Figure 37:
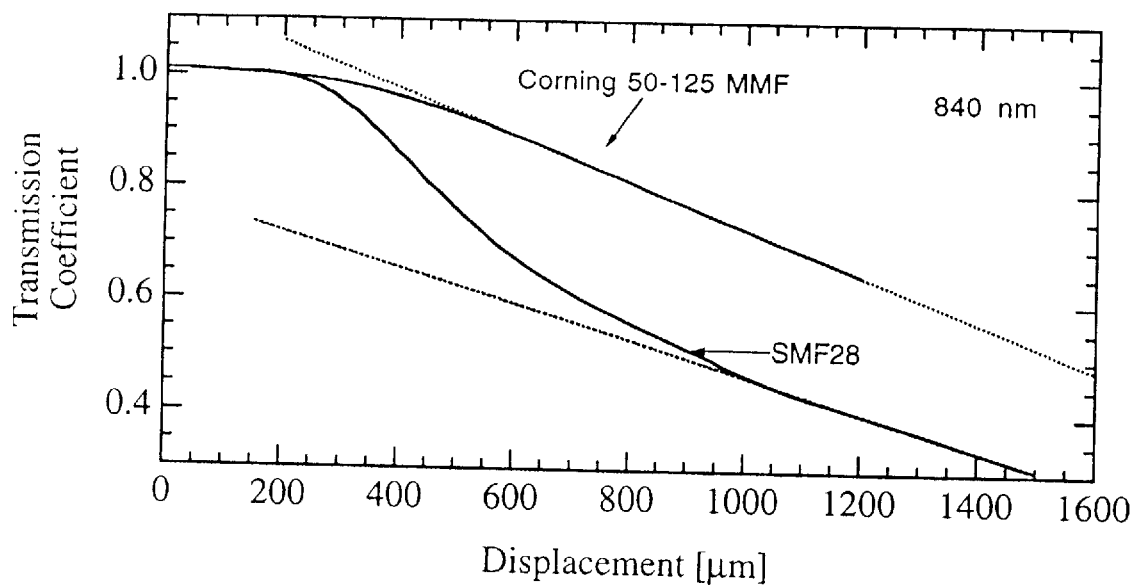
FIG. 37 is a graphical representation comparing transmission data of an Ω sensor taken using different types of fibers.

Corning SMF 28 fiber, which is single mode at 1300 nm wavelength, supports two propagating modes at 840 nm, the $LP_{01}$ and $LP_{11}$ modes. FIG. 37 shows the optical response of two $L_o$=10 mm $\Omega$-type sensors made with Corning 50-125 multimode fiber and with Corning SMF-28 fiber. Both sensors were illuminated with an 840 nm LED. As can be seen in FIG. 37, the threshold displacement is much greater for the highly multimode 50-125 fiber, and the SMF 28 two-mode fiber has a significantly greater sensitivity for displacements between 200 and 800 $\mu$m. For larger displacements, the two different fiber types exhibit nearly identical slopes.

Figure 38:
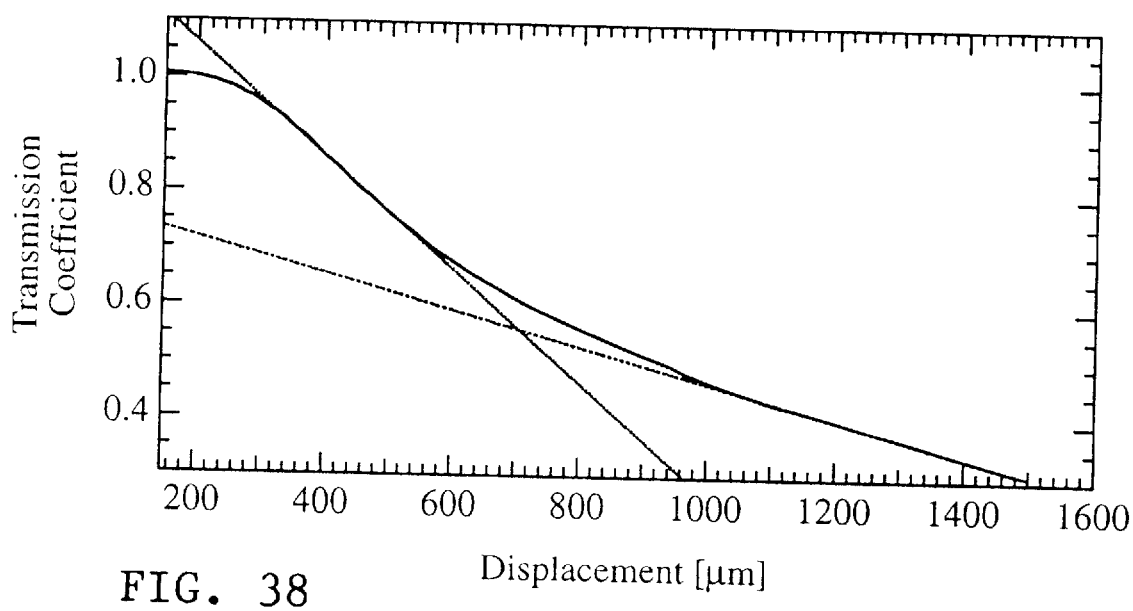
FIG. 38 is a graphical representation for the transmission data presented in FIG. 37 of only one of the two fibers.

The SMF 28 data alone is presented in FIG. 38, with two linear least square fit lines superimposed. The data clearly demonstrate a two regime response associated with the different losses of each mode.

SINGLE MODE SENSORS

Figure 39:
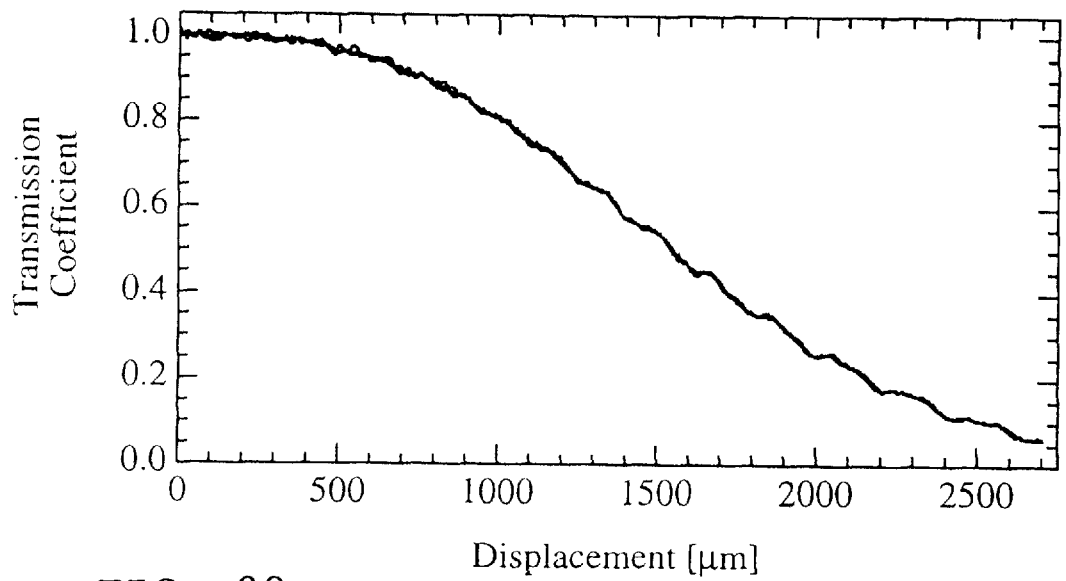
FIG. 39 is a graphical representation of transmission data taken using a single-mode fiber.

FIG. 39 presents the optical response of a single mode $L_o$=9 mm $\Omega$-type sensor. The sensor was illuminated with a four mode He-Ne laser operating at 633 nm. The data presented are for three different scans corresponding to expansion, compression and a final expansion. The data exhibit far more intensity noise than the LED data due to the He-Ne amplitude noise. In spite of this noise, the data clearly exhibit reproducible loss oscillations, thought to be due to interference of the guided mode with whispering gallery modes of the cladding and fiber coating. This interferometric effect can be utilized in device applications for enhancing sensitivity and providing an absolute displacement calibration by using a frequency modulation technique known in the field of optical interferometric sensors.

SUMMARY

Figure 42A:
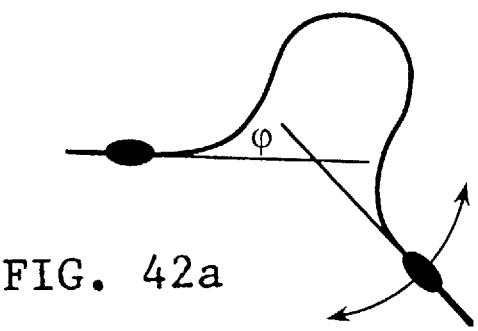
FIG. 42, which comprises FIGS. 42a and 42b, provides a view of an Ω sensor used at an arbitrary, off-axis angle φ in rotation and translation, respectively.
Figure 42B:
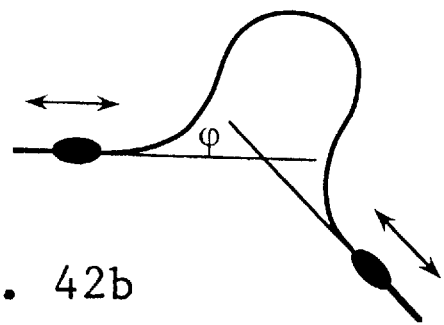
Figure 40A:
FIGS. 40a, 40b and 40c, is a schematic of various shapes that an Ω sensor assumes for different displacements.
Figure 40B:
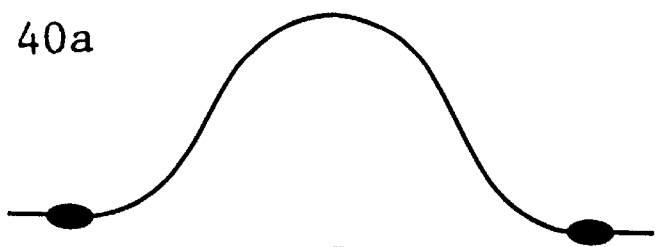
Figure 40C:
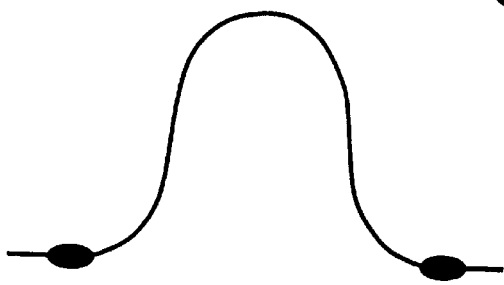
Figure 41A:
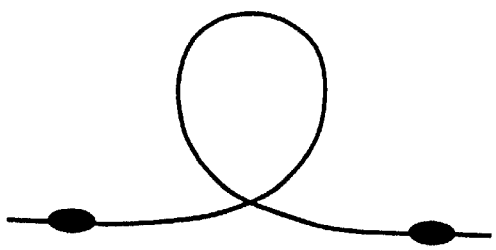
FIGS. 41a, 41b and 41c, is a schematic of various shapes that an a sensor assumes for different displacements.
Figure 41B:
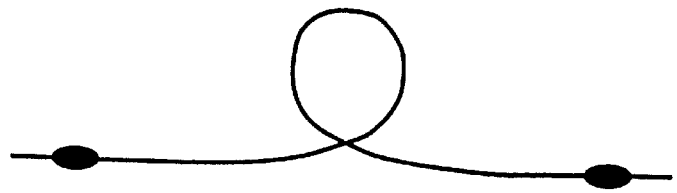
Figure 41C:

It will now be understood that what has been disclosed herein comprises a new concept in sensors and particularly in fiber optic sensors. A number of different embodiments have been disclosed. FIG. 40, comprising FIGS. 40a through 40c, illustrates what is referred to herein as the $\Omega$-type fiber optic displacement sensor. As shown in FIG. 40, a length of optical fiber, restrained only at two spaced points to move in a unitary direction, becomes increasingly buckled as the distance between those spaced points is reduced. The optical transmission loss through the fiber increases in a highly predictable manner that permits extremely sensitive displacement measurement over a wide dynamic range. FIG. 41, comprising FIGS. 41a through 41c, illustrates what is referred to herein as an $\alpha$-type sensor wherein the buckling-induced optical transmission loss is a result of a loop-configured length of fiber having boundary conditions similar to the $\Omega$-type sensor. A more generic form of the $\Omega$-type sensor is shown in FIGS. 42a and 42b wherein one of the two directions of movement of the spaced points may be at an angle $\phi$ with respect to the other direction, where $\phi$ is any angle from 0 to 90 degrees.

Figure 43:
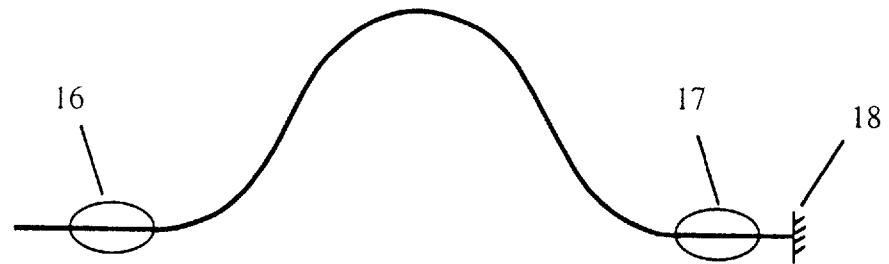
FIG. 43 is a schematic view of an Ω sensor combined with a reflecting mirror.
Figure 44:
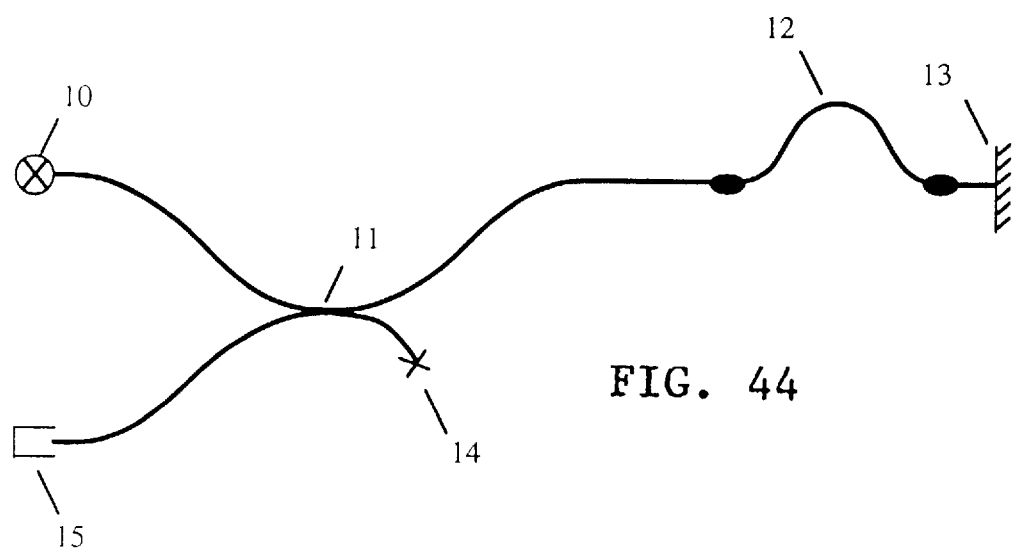
FIG. 44 is a block diagram of a system designed to measure displacements using the mirrored sensor of FIG. 43.
Figure 45:
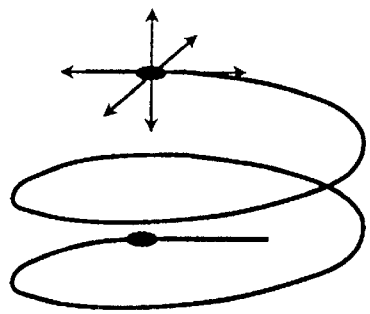
FIG. 45 illustrates a non-planar, three-dimensional version of the invention wherein the fiber bending occurs at least partially outside the plane containing the two attachment points.

Loss through a sensor of the present invention may be measured in many ways. By way of further example, FIGS. 43 and 44 illustrate use of a mirror 18 at one end 17 of an $\Omega$-type sensor wherein a light source 10 and a detector 15 are connected at end 16 through a terminated end 14/coupler 11 to an $\Omega$-type sensor 12 wherein a mirror 13 reflects light which thus experiences a double bend loss induced by the buckling effect. Finally, it will be understood that although each of the heretofore disclosed embodiments relies on a planar configured fiber between the spaced attachment points, the present invention is not necessarily limited to such a configuration. FIG. 45 illustrates a non-planar or three-dimensional version of the invention wherein the fiber bending occurs at least partially outside the plane containing the two spaced attachment points between which a distance is determined by the light transmission loss through the fiber. The various directions of motion are indicated by arrows.

FIG. 45 shows a possible three-dimensional shape the sensor can assume. Any relative motion between the two attachment points can be resolved into being composed of motion along the three principal axes, as indicated in the figure, and consequently sensed. Note that the moving attachment point can be located anywhere inside a sphere of slightly less than radius $L_o$ (the extended sensor length) around the stationary attachment point.

Figure 46:
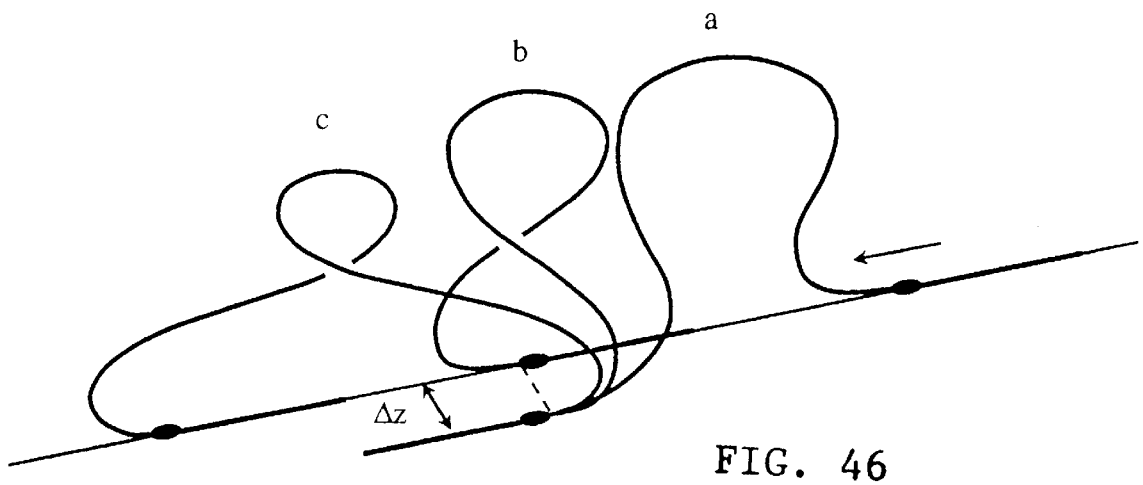
FIG. 46 indicates how the shape of a transversely offset sensor progresses for extremely large displacements (between 70% and 130% of the extended length)

FIG. 46 presents the progression of the shape of an Ω sensor whose two attachment points were offset transversely with respect to each other by a distance Δz. The three shapes a, b and c correspond to displacements by 70%, 100% and 130% of the extended sensor length $L_o$, respectively. The distance Δz is only necessary to allow the two attachment points to pass next to each other and can be small in practice. Such an Ω sensor can be displaced by up to 180% of its length and still remain operational.

Figure 47:
FIG. 47 is a representation of the "racetrack" shape an α sensor will assume for displacements of more than 100%.

FIG. 47 is a representation of the shape a planar α sensor will assume when displaced by more than 100% of its extended length. We call this shape the "racetrack" shape. The parts of the fiber leading into and away from the sensor again have to avoid each other, but the shape has no other restriction.

Figure 48:
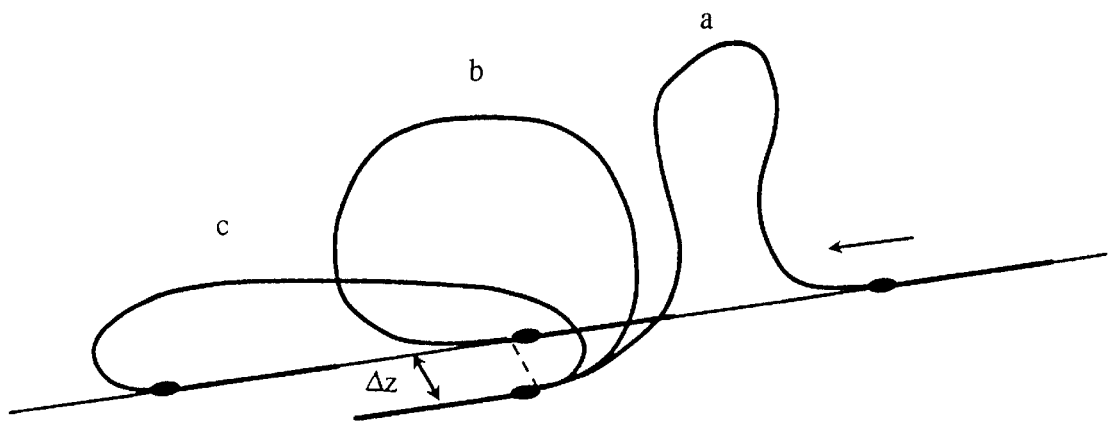
FIG. 48 depicts the change of the sensor from an Ω shape through an α shape into the racetrack shape.

FIG. 48 presents another possible progression of the Ω sensor shape when the sensor is displaced by large amounts. Unless special precautions (specifically, twisting the fiber) are taken, the Ω sensor will (for displacements larger than about 75% of its length) twist in the third dimension (as indicated in case a), eventually crossing into a shape related to that of the α sensor. For a displacement of 100% (case b in the figure), the sensor will assume a circular shape, and for greater displacements move into a racetrack-like shape as introduced in FIG. 47. The sensor can sense and survive an exceptionally large displacement.

Figure 49:
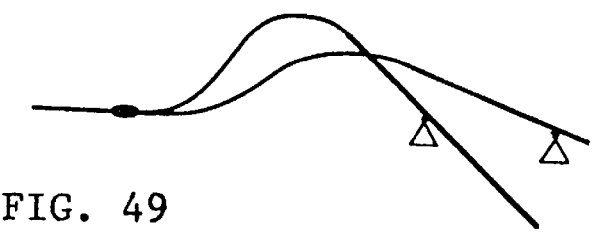
FIG. 49 is an example of a clamped-hinged Ω sensor.

FIG. 49 shows an Ω-type sensor having clamped-hinged boundary conditions. This is useful for situations where there are extremely large dimensional variations where the hinged end allows for larger displacements than clamped ends.

Those having skill in the art to which the present invention pertains, will now perceive various modifications and additions which may be made to the invention while still achieving the objects and advantages thereof. Accordingly, it will be understood that all such modifications and additions are deemed to be within the scope hereof which is to be limited only by the appended claims and their equivalents.

We claim:

1. A fiber optic sensor comprising:

a selected length of optical fiber having a substantially smooth, intact cladding completely surrounding an internal core and positioned between two spaced points, at least one of said points being free to move relative to the other of said spaced points along a selected direction in response to a sensed parameter, the length of fiber being unrestrained between the spaced points to permit predictable non-linear buckling of the fiber as the distance between said spaced points is reduced; and means for measuring relative light transmission loss through said length of fiber to determine the precise distance between said spaced points as a function of said light transmission loss.

2. The sensor recited in claim 1 wherein said length of fiber is parallel to said selected direction at said spaced points.

3. The sensor recited in claim 2 wherein said length of fiber is held parallel to said selected direction at said spaced points without any substantial compression of said fiber.

4. The sensor recited in claim 3 wherein said fiber is held parallel at said spaced points by external tubes.

5. The sensor recited in claim 3 wherein said fiber is held parallel at said spaced points by elongated slotted pins.

6. The sensor recited in claim 3 wherein said fiber is held parallel at said spaced points by non-compressing clamps.

7. The sensor recited in claim 1 wherein said fiber is configured as a loop between said spaced points.

8. The sensor recited in claim 1 wherein said spaced points are located on two distinct parallel lines.

9. The sensor recited in claim 1 wherein said spaced points are located on two distinct lines forming an angle of from 0 to 180 degrees therebetween.

10. The sensor recited in claim 1 wherein said spaced points are located on two distinct lines, each such line being in a different plane intersecting at least a portion of said length of fiber.

11. The sensor recited in claim 1 wherein said length of fiber is taken from the group of fibers consisting of single mode fiber, two mode fiber, several mode fiber and multi-mode fiber.

12. The sensor recited in claim 1 wherein said length of fiber is selected to have a wavelength-dependent loss characteristic which provides a selected resolution for the expected range of distance variation between said spaced points.

13. The sensor recited in claim 1 wherein said means for measuring comprises a source of light at a first end of said fiber and a detector at a second end of said fiber.

14. The sensor recited in claim 1 wherein said means for measuring comprises an optical time domain reflectometer.

15. The sensor recited in claim 1 wherein said means for measuring comprises a source of light and a detector at a first end of said fiber and a mirror at a second end of said fiber.

16. A sensor comprising:

a length of optical fiber having a substantially smooth, intact cladding completely surrounding an internal core at least one selected portion of which is secured between two spaced points, at least one of said points being movable relative to the other of said spaced points along a selected direction in response to a physical phenomenon, said selected portion of fiber being unrestrained between said spaced points to permit macrobending of said selected portion of fiber as the distance between said spaced points is changed by said physical phenomenon; and means for measuring the light transmission attenuation through said selected portion of said fiber due to said macrobending.

17. The sensor recited in claim 16 wherein said length of fiber is parallel to said selected direction at said spaced points.

18. The sensor recited in claim 17 wherein said length of fiber is held parallel to said selected direction at said spaced points without any substantial compression of said fiber.

19. The sensor recited in claim 18 wherein said fiber is held parallel at said spaced points by external tubes.

20. The sensor recited in claim 18 wherein said fiber is held parallel at said spaced points by elongated slotted pins.

21. The sensor recited in claim 18 wherein said fiber is held parallel at said spaced points by non-compressing clamps.

22. The sensor recited in claim 16 wherein said fiber is configured as a loop between said spaced points.

23. The sensor recited in claim 16 wherein said spaced points are located on two distinct parallel lines.

24. The sensor recited in claim 16 wherein said spaced points are located on two distinct lines forming an angle of from 0 to 180 degrees therebetween.

25. The sensor recited in claim 16 wherein said spaced points are located on two distinct lines, each such line being in a different plane intersecting at least a portion of said length of fiber.

26. The sensor recited in claim 16 wherein said length of fiber is taken from the group of fibers consisting of single mode fiber, two mode fiber, several mode fiber and multimode fiber.

27. The sensor recited in claim 16 wherein said length of fiber is selected to have a wavelength-dependent loss characteristic which provides a selected resolution for the expected range of distance variation between said spaced points.

28. The sensor recited in claim 16 wherein said means for measuring comprises a source of light at a first end of said fiber and a detector at a second end of said fiber.

29. The sensor recited in claim 16 wherein said means for measuring comprises an optical time domain reflectometer.

30. The sensor recited in claim 16 wherein said means for measuring comprises a source of light and a detector at a first end of said fiber and a mirror at a second end of said fiber.

31. The sensor recited in claim 16 wherein said selected portion of fiber is clamped at one of said spaced points and hinged at the other of said spaced points.

* * * * *